US008544757B2

(12) United States Patent
Stahl et al.

(10) Patent No.: US 8,544,757 B2
(45) Date of Patent: Oct. 1, 2013

(54) TRANSACTION PRODUCT WITH EXPANDABLE PAGES AND THREE DIMENSIONAL VIEWING

(75) Inventors: Kirstin Stahl, Minnetonka, MN (US); Brenda Irlbeck, Minneapolis, MN (US); Sage C. Rider, St. Louis Park, MN (US); Jessica D. Albrecht, Woodbury, MN (US); Primoz Samardzija, Marina del Ray, CA (US); Timothy P. Clegg, Manhatten Beach, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/368,989

(22) Filed: Feb. 8, 2012

(65) Prior Publication Data

US 2013/0161401 A1 Jun. 27, 2013

Related U.S. Application Data

(60) Provisional application No. 61/580,184, filed on Dec. 23, 2011.

(51) Int. Cl.

| | |
|---|---|
| ***G06K 19/06*** | (2006.01) |
| ***G06K 5/00*** | (2006.01) |
| ***G06K 19/00*** | (2006.01) |
| ***G06K 19/02*** | (2006.01) |
| ***B42D 1/06*** | (2006.01) |
| ***B42D 3/10*** | (2006.01) |
| ***B42D 15/10*** | (2006.01) |
| *G06K 21/00* | (2006.01) |

(52) U.S. Cl.
USPC ........... 235/492; 235/380; 235/487; 235/488; 235/489; 283/85; 283/100; 281/5

(58) Field of Classification Search
USPC ............. 235/380, 487, 492, 488, 489; 281/5; 283/85, 100
See application file for complete search history.

(56) References Cited

U.S. PATENT DOCUMENTS

| | | | |
|---|---|---|---|
| 2,116,411 | A | 5/1938 | Philipson |
| 2,546,878 | A | 3/1947 | Townley |

(Continued)

OTHER PUBLICATIONS

"Peel-A-Deal® Bar Coded Card," http://www.peeladeal.com/products.php?code=pad_barcode&prod=Bar%20%20Coded%20Card, available at least as early as Aug. 27, 2009 (3 pages).

(Continued)

*Primary Examiner* — Steven S Paik
*Assistant Examiner* — Claude J Brown
(74) *Attorney, Agent, or Firm* — Griffiths & Seaton PLLC; JoAnn M. Seaton

(57) ABSTRACT

A transaction product includes a cover, a sheet support member, a plurality of separate sheet members, and an account identifier. Each of the plurality of separate sheet members transition between folded and unfolded configurations. Each of the plurality of separate sheet members is coupled to the cover via the sheet support member. In the folded configuration, each separate sheet member is maintained within a footprint of the cover. In the unfolded configuration, each separate sheet member extends beyond the footprint of the cover. When one separate sheet member is in the unfolded configuration others of the plurality of separate sheet members are in the folded configuration and substantially hidden from view via the sheet support member. The account identifier is statically connected to one of the cover, the sheet support member, and the plurality of separate sheet members and links the transaction product to a financial account.

23 Claims, 26 Drawing Sheets

(56) References Cited

U.S. PATENT DOCUMENTS

| | | | | |
|---|---|---|---|---|
| 2,525,937 | A | 10/1950 | Palm | |
| 2,586,071 | A | 2/1952 | Manen-Mayol | |
| 2,714,448 | A | 8/1955 | Brown | |
| 4,299,410 | A * | 11/1981 | Jukola | 281/21.1 |
| 4,502,711 | A | 3/1985 | Muth | |
| 4,627,640 | A * | 12/1986 | Markovics | 281/5 |
| 4,826,212 | A | 5/1989 | Muth et al. | |
| 5,156,266 | A | 10/1992 | Sykora | |
| 5,454,644 | A | 10/1995 | Augustin | |
| 5,613,612 | A | 3/1997 | Davault | |
| 5,636,782 | A | 6/1997 | Moore | |
| D388,813 | S | 1/1998 | Feuchtmayer | |
| D396,872 | S | 8/1998 | Wang | |
| D396,873 | S | 8/1998 | Wang | |
| D401,957 | S | 12/1998 | Wu | |
| 5,864,973 | A | 2/1999 | Cole | |
| D413,347 | S | 8/1999 | Wang | |
| D413,348 | S | 8/1999 | Wang | |
| 5,938,014 | A | 8/1999 | Wilkinson | |
| D413,615 | S | 9/1999 | Wang | |
| D413,616 | S | 9/1999 | Wang | |
| D416,036 | S | 11/1999 | Wang | |
| D420,692 | S | 2/2000 | Wang | |
| D425,101 | S | 5/2000 | Wang | |
| D427,224 | S | 6/2000 | Wang | |
| D429,750 | S | 8/2000 | Wang | |
| D431,831 | S | 10/2000 | Gonzalez | |
| D432,154 | S | 10/2000 | Wang | |
| D432,155 | S | 10/2000 | Wang | |
| D434,056 | S | 11/2000 | Wang | |
| D434,060 | S | 11/2000 | Wang | |
| D434,429 | S | 11/2000 | Wang | |
| D434,653 | S | 12/2000 | Maguire | |
| D442,984 | S | 5/2001 | Wang | |
| 6,390,372 | B1 | 5/2002 | Waters | |
| 6,431,606 | B1 | 8/2002 | Lowe et al. | |
| 7,047,677 | B2 | 5/2006 | Rambaldi | |
| 7,275,683 | B2 | 10/2007 | Lazarowicz et al. | |
| 7,317,573 | B2 | 1/2008 | Billen | |
| 7,409,788 | B2 | 8/2008 | Lauer et al. | |
| 7,584,558 | B2 | 9/2009 | Boyd et al. | |
| 7,591,418 | B2 | 9/2009 | Halbur et al. | |
| 7,677,458 | B2 | 3/2010 | Lindahl et al. | |
| 7,717,347 | B2 | 5/2010 | Boyd et al. | |
| 7,891,122 | B2 | 2/2011 | Lauer et al. | |
| 8,091,781 | B2 | 1/2012 | Albrecht et al. | |
| 2002/0088855 | A1 | 7/2002 | Hodes | |
| 2002/0143697 | A1 | 10/2002 | Gotfried | |
| 2002/0162254 | A1 | 11/2002 | Boon | |
| 2004/0215573 | A1* | 10/2004 | Teutenberg et al. | 705/64 |
| 2004/0251678 | A1 | 12/2004 | Dacey | |
| 2007/0152066 | A1 | 7/2007 | Colby et al. | |
| 2009/0112711 | A1 | 4/2009 | Clegg et al. | |
| 2009/0166436 | A1 | 7/2009 | Haugen et al. | |
| 2009/0280461 | A1 | 11/2009 | Kerwick | |
| 2009/0308920 | A1 | 12/2009 | Holt et al. | |
| 2010/0170946 | A1 | 7/2010 | Lindahl et al. | |
| 2011/0013276 | A1 | 1/2011 | Choi | |
| 2011/0094132 | A1 | 4/2011 | Defranco et al. | |
| 2011/0099129 | A1 | 4/2011 | Lauer et al. | |
| 2011/0101090 | A1 | 5/2011 | Halbur et al. | |
| 2011/0101611 | A1 | 5/2011 | Pompei et al. | |
| 2012/0104742 | A1* | 5/2012 | Scrymgeour et al. | 283/85 |

OTHER PUBLICATIONS

"Go-Tag™ Solution," firstdata.com, 2008 (2 pages).

"Contactless Payments: Consumer Trends and Usage Preferences," firstdata.com, 2008 (2 pages).

Gutt, Hedi et al., "Big Book of the Human Body: Pop-Up Book with 3D Glasses" offered for sale via ebay.com, published 2006.

Javins, Marie, "3-D Atlas & World Tour" as offered for sale on amazon.com, published Sep. 1, 2008.

Office Action from Canadian Patent Application No. 2,790,235, mailed Apr. 2, 2013 (2 pages).

* cited by examiner

TRANSACTION PRODUCT WITH EXPANDABLE PAGES AND THREE DIMENSIONAL VIEWING

CROSS-REFERENCE TO RELATED APPLICATION

This non-provisional application claims the benefit under 35 U.S.C. §119(e) to U.S. Provisional Application No. 61/580,184, filed Dec. 23, 2011, which is incorporated herein in its entirety.

BACKGROUND OF THE INVENTION

Stored-value cards and other transaction products come in many forms. A gift card, for example, is a type of transaction product that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product comprising a cover, a sheet support member, a plurality of separate sheet members, and an account identifier. Each of the plurality of separate sheet members is configured to transition between a folded configuration and an unfolded configuration. Each of the plurality of separate sheet members is coupled to the cover via the sheet support member. In the folded configuration, each of the plurality of separate sheet members is maintained within a footprint of the cover. In the unfolded configuration, each of the plurality of separate sheet members extends beyond the footprint of the cover by extending beyond at least two outermost edges of the cover. When one of the plurality of separate sheet members is in the unfolded configuration, others of the plurality of separate sheet members are in the folded configuration and substantially hidden from view via the sheet support member. The account identifier is statically connected to one of the cover, the sheet support member, and the plurality of separate sheet members, wherein the account identifier links the transaction product to a financial account and is machine readable by a point-of-sale terminal. Stored-value cards, methods of providing a transaction card, and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
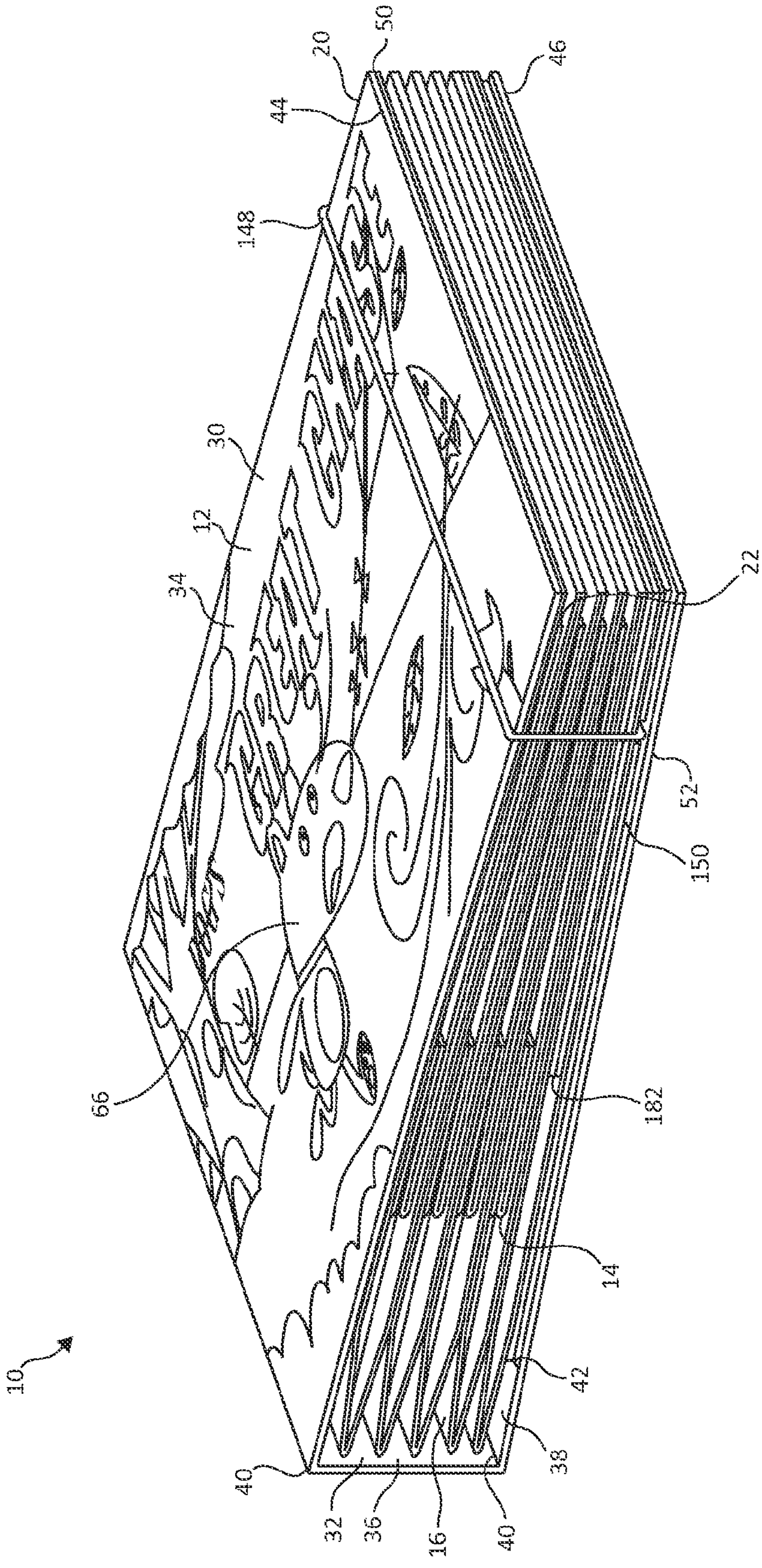
FIG. 1 is a perspective view illustration of a transaction product in a closed configuration, according to one embodiment of the present invention.
Figure 2:
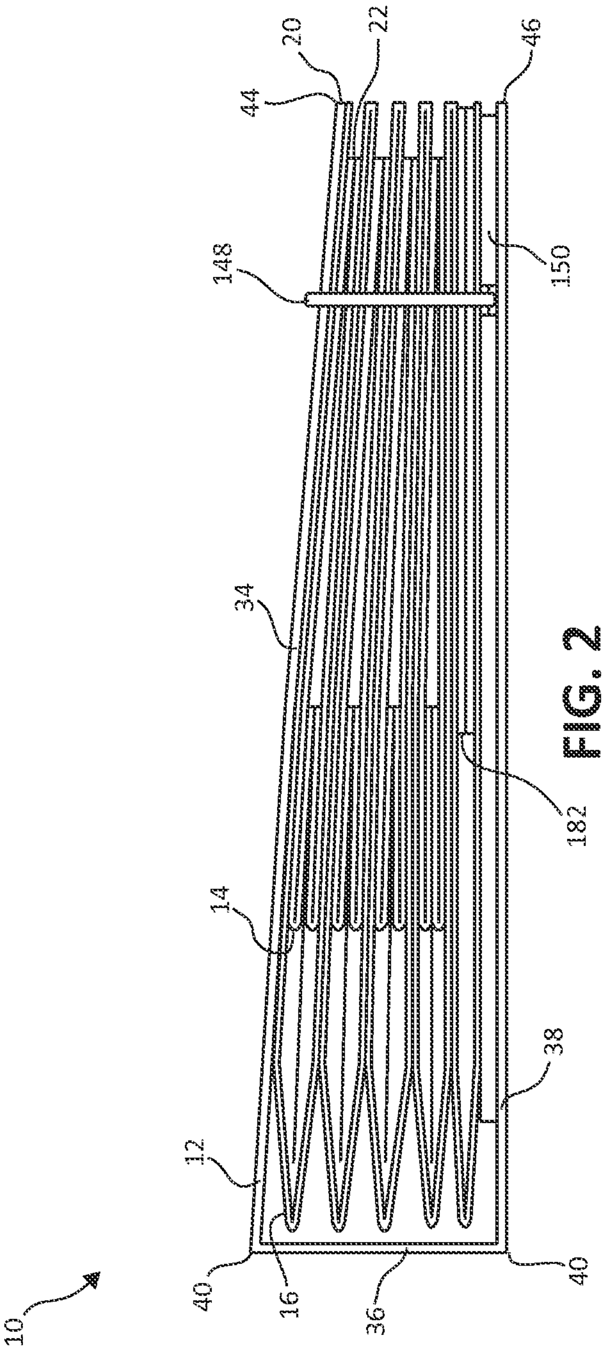
FIG. 2 is a front view illustration of the transaction product of FIG. 1, according to one embodiment of the present invention. The rear view is a mirror image of the front view.
Figure 3:
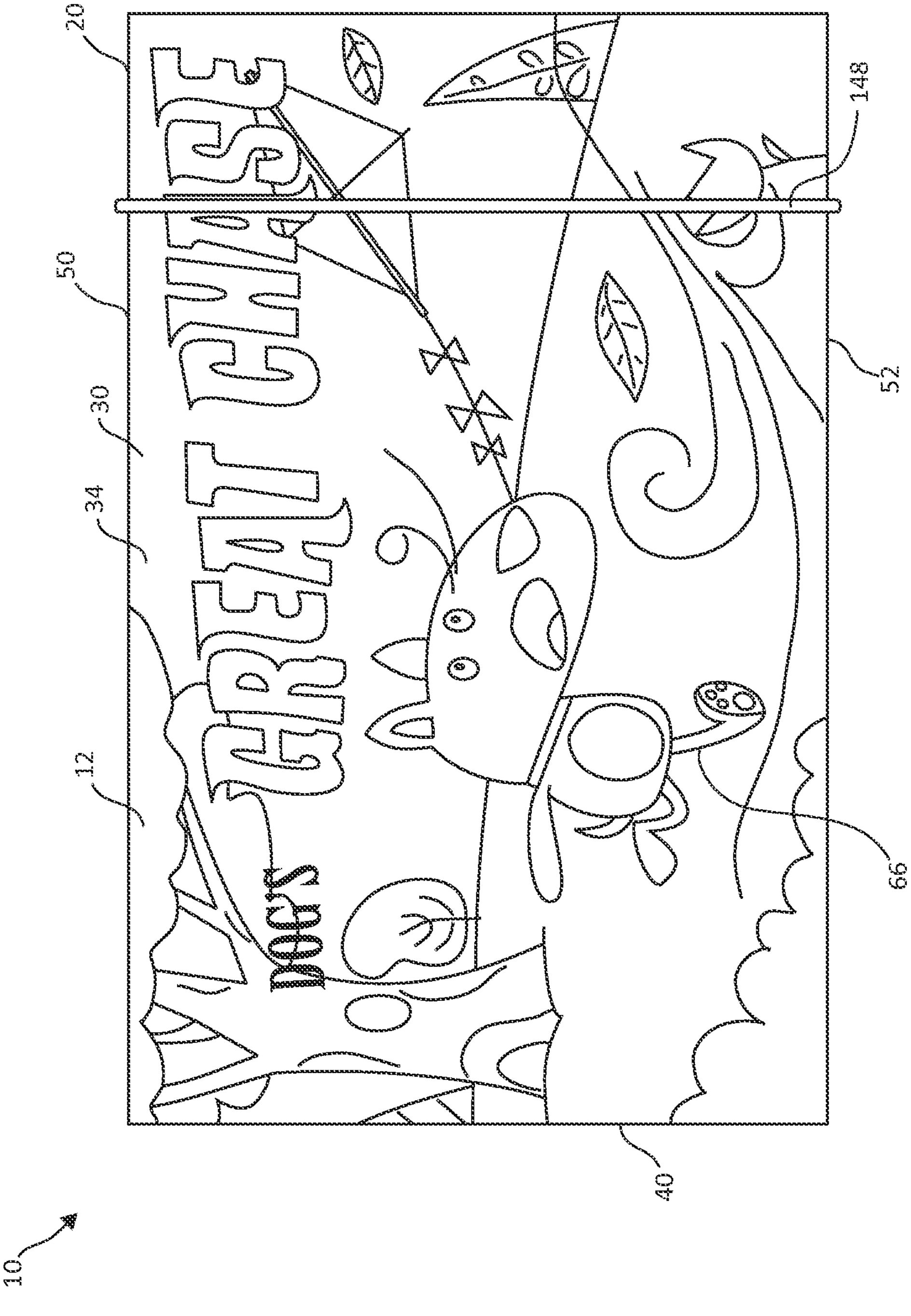
FIG. 3 is a top view illustration of the transaction product of FIG. 1, according to one embodiment of the present invention.

The following detailed description of the invention provides examples and is not intended to limit the invention or the application and uses of the invention. Furthermore, there is no intention to be bound by any theory presented in the preceding background of the invention or the following detailed description of the invention.

A stored-value card or other transaction product is adapted to facilitate making purchases of goods and/or services at, for example, a retail store or web site. According to one embodiment, an original consumer buys a transaction product to give a recipient who in turn is able to use it to pay for goods and/or services. A transaction product, according to embodiments of the present invention, provides the consumer and recipient with extra amusement and functionality in addition to the ability to pay for goods and/or services with the associated transaction product.

In particular, according to one embodiment, the transaction product includes a booklet configuration including expandable individual pages. Each page, for example, is configured to automatically fold into a folded configuration when the corresponding page support members are folded toward one another and, conversely, to automatically unfold upon opening of the corresponding page support members, i.e., movement of corresponding page support members away from one another. In one embodiment, when pages are folded, each fits well within the footprint of a cover member. However, when pages are unfolded, they extend outwardly beyond at least two outer edges of the cover member, thereby providing additional copy space for supporting story graphics, text, etc. to the surprise and delight of a viewer interacting with the non-transactional features of the transaction product.

In one embodiment, each page includes three-dimensional ("3D") graphics further contributing the aesthetically pleasing and delightful nature of the transaction product. In one example, the transaction product is provided with 3D viewing glasses, which may be provided in a theme consistent with or corresponding to the story presented on the pages, a store configured to redeem the transaction product, etc. As shown in the embodiments illustrated in this application, in one instance, 3D glasses are formed to resemble a portion of a dog, for example, with ears similar to that of a dog. As such, when a user wears the glasses to view the pages, she is outfitted to appear similar to and correspond with a character, theme, subject, surrounding, or other aspect of the associated story, which further adds to a user's enjoyment of the product and associated assembly.

In one example, the transaction product is configured to store the glasses during periods of non-use. The integrated storage keeps the glasses close at hand for reviewing the pages and generally decreases a user's chance of misplacing the glasses. The above-described aspects of the transaction product are displayed and promoted on the packaging used for the transaction product in a manner promoting the sale, use, and/or loading of the transaction product by potential consumers and/or bearers of the transaction product.

Turning to the figures, FIGS. 1-8 illustrate various views of one embodiment of a transaction product 10 such as a stored-value or prepaid access product (e.g., a gift card, phone card, etc.), credit product, etc. according to the present invention. Transaction product 10 is configured to be used toward the purchase and/or use of goods and/or services and includes an enclosing member or cover 12, expandable pages or sheet members 14, and a page coupling member or sheet support member 16. Cover 12 is configured to be manipulated between a closed position as illustrated, for example, in FIGS. 1-6, and at least one fully open position as illustrated, for example, in FIG. 8. When transaction product 10 is closed, sheet member 14 is in a folded configuration such that an outer perimeter edge 22 of folded sheet member 14 is maintained within a footprint of cover 12 or, otherwise stated, is maintained entirely within an outer perimeter edge 20 of cover 12. When transaction product 10 is manipulated to the at least one fully open position, sheet member 14 automatically transitions from the folded configuration to an unfolded configuration, for example as shown approximately midway through the transition in FIG. 7. In the unfolded configuration, an outer perimeter edge 24 of the unfolded sheet member 14, which is greater in overall length than the outer perimeter edge 22 of sheet member 14 in the folded configuration, extends beyond at least a portion of an outer perimeter edge 20 of cover 12, and in one embodiment, sheet member 14 extends substantially parallel to and immediately adjacent at least a portion of sheet support member 16, as will be further described below.

In one embodiment, cover 12 is formed as a substantially planar member from cardstock, paper, plastic, composite, or other suitable material with rigidity to support the overall form of transaction product 10 while still being foldable or otherwise manipulable between open and closed positions. Cover 12 defines a first or exterior surface 30 and a second or interior surface 32 (see, e.g., FIGS. 1 and 13) opposite exterior surface 30, wherein each of exterior surface 30 and interior surface 32 are substantially planar. Cover 12 is, in one instance, substantially rectangular defining a first free transverse edge 44, a second free transverse edge 46 opposite and extending substantially parallel to a first free transverse edge 44, a first longitudinal or rear free edge 50 extending between and substantially perpendicularly to first free transverse edge 44 and second free transverse edge 46, and a second longitudinal or front free edge 52 extending between and substantially perpendicularly to first free transverse edge 44 and second free transverse edge 46. Covers having other suitable shapes are also contemplated.

In one example, cover 12 includes a first or top panel 34, a second or intermediate panel 36, and a third or bottom panel 38 all formed from a single member, but separated by fold lines 40. Each of fold lines 40 transversely extends across cover 12, for example, parallel to first free transverse edge 44 and second free transverse edge 46 of cover 12. In one embodiment, one or more additional fold lines extend across one of panels 34, 36, and 38. For example, as illustrated, a fold line 42 extends transversely across bottom panel 38 near the one of fold lines 40 adjacent bottom panel 38. Fold line 42 provides for additional freedom and ease of movement of cover 12 as will be further described below. Notably, directional identifiers such a top, bottom, front, back, left, right, etc. are used in correlation with the configuration of the illustrated figures and are not intended to limit or otherwise be associated with a single card configuration. Accordingly, any product can be rotated to change what is considered a top, bottom, front, back, left, right, or similarly described feature.

Transaction product 10, for example, one of cover 12, sheet members 14, and sheet support member 16 further includes an account identifier 60 (see, e.g., FIG. 4) such as a bar code, magnetic strip, a smart chip or other electronic device, a radio frequency identification (RFID) device or other suitable identifier readily machine readable by a point-of-sale terminal or other account access station or kiosk. Account identifier 60 indicates an account or record to which transaction product 10 is linked. The account or record of the monetary or other balance on transaction product 10 optionally is maintained on a database, other electronic or manual record-keeping system or, in the case of "smart" cards for example, on a chip or other electronics or devices on transaction product 10 itself. Accordingly, by scanning account identifier 60, the account or record linked to transaction product 10 is identified and can subsequently be activated, have amounts debited therefrom and/or have amounts added thereto.

In one embodiment, account identifier 60 is printed on exterior surface 30 of cover 12 and includes a character string or code 62 (e.g., a number and or letter string) configured to provide additional security to the use of transaction product 10 and/or configured to be read by a bearer of transaction product 10 to facilitate use of transaction product 10 for web site or other purchases outside of a brick-and-mortar type retail establishment. With the above in mind, account identifier 60 is one example of means for linking transaction product 10 with an account or record, and account identifier 60 is one example of means for activating or loading value on transaction product 10.

Figure 4:
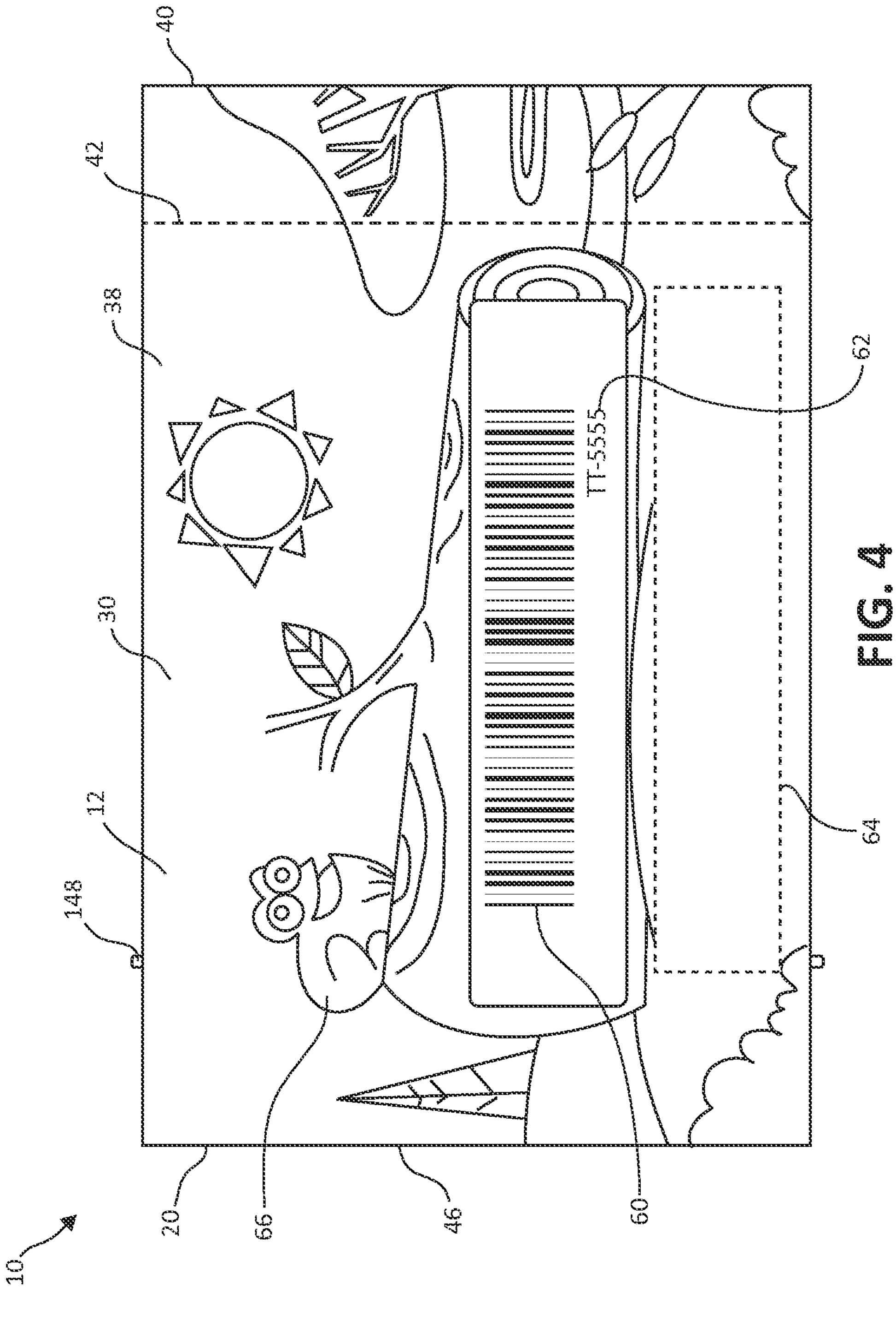
FIG. 4 is a bottom view illustration of the transaction product of FIG. 1, according to one embodiment of the present invention.
Figure 5:
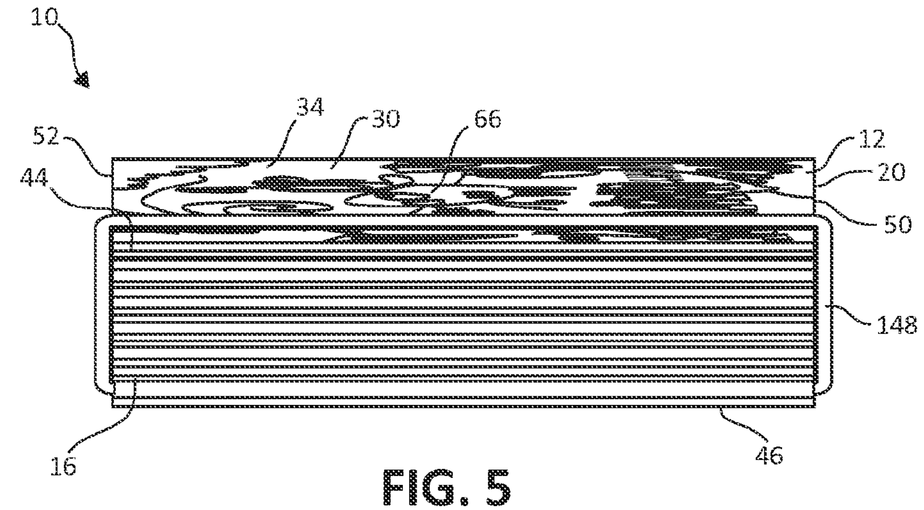
FIG. 5 is a right side view illustration of the transaction product of FIG. 1, according to one embodiment of the present invention.
Figure 6:
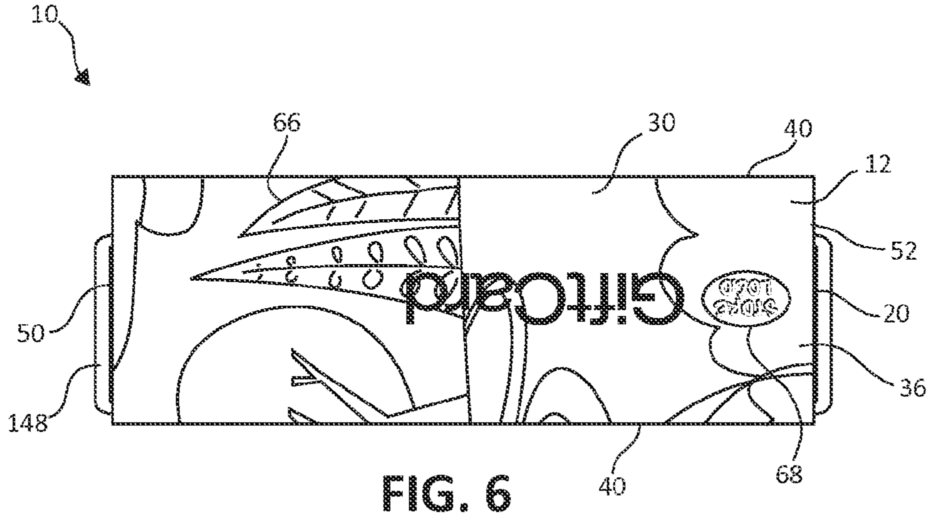
FIG. 6 is a left side view illustration of the transaction product of FIG. 1, according to one embodiment of the present invention.

In one embodiment, exterior surface 30, for example, a portion of exterior surface 30 formed by bottom panel 38 of cover 12 includes redemption indicia, which are generally indicated by a dashed box 64 in FIG. 4. In one example, redemption indicia 64 are alternatively or additionally included on other suitable portions of cover 12 or other portions of transaction product 10. Redemption indicia 64 indicate that transaction product 10 is redeemable for the purchase of goods and/or services and that, upon use, a value of the purchased goods and/or services will be deducted from the financial account or record linked to transaction product 10. In one embodiment, redemption indicia 64 include phrases such as "<NAME OF STORE> GiftCard" and "This GiftCard is redeemable for merchandise or services at any of our stores or at our web site," and/or provides help or phone line information in case of a lost, stolen or damaged stored-value card, etc. Other indicia, such as decorative indicia 66 and/or brand indicia 68 (see, e.g., FIG. 6) may also be included on cover 12 as will be apparent to those of skill in the art upon reading the present application.

Figure 10:
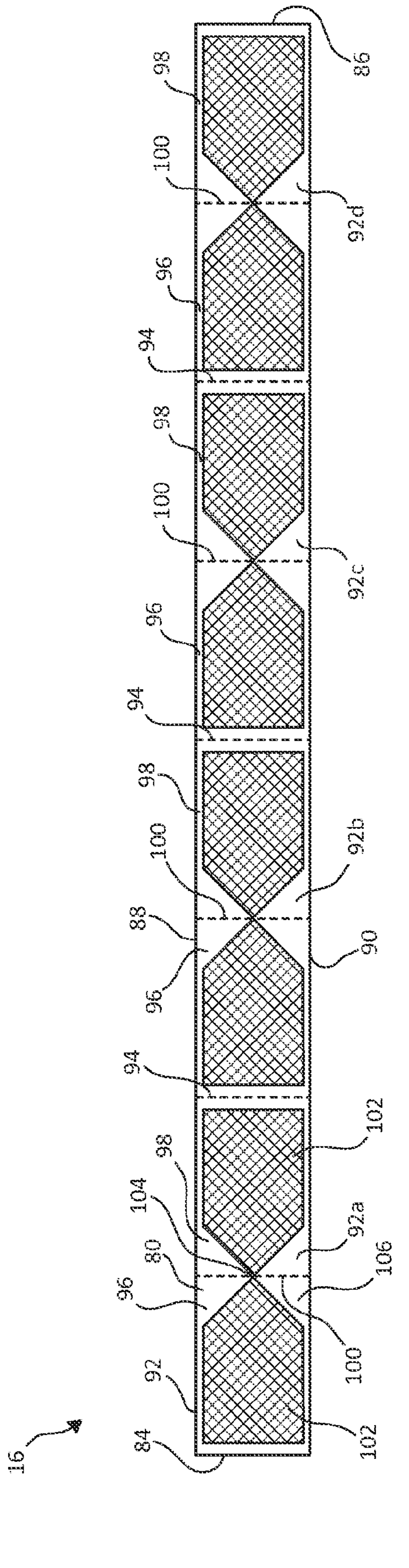
FIG. 10 is a top view illustration of an unfolded sheet support member of the transaction product of FIG. 1, according to one embodiment of the present invention.

FIG. 10 illustrates unfolded sheet support member 16, which, in the illustrated embodiment, is substantially planar and defines an exposed surface 80 and an opposite internal surface 82. Sheet support member 16 is formed of any suitable material such as paper, cardstock, plastic, composite, or other material capable of providing rigidity to sheet members 14 and, in one embodiment, of folding over itself. Each of exposed surface 80 and internal surface 82 is substantially planar. In one embodiment, sheet support member 16 is elongated and defines a first free transverse edge 84 and a second free transverse edge 86 opposite first free transverse edge 84. A first longitudinal or rear edge 88 of sheet support member 16 longitudinally extends between first free transverse edge 84 and second free transverse edge 86, and a second longitudinal or front edge 90 of sheet support member 16 longitudinally extends between first free transverse edge 84 and second free transverse edge 86 opposite rear edge 88.

In one example, sheet support member 16 is divided into a plurality of pairs of panels 92 each pair of panels more specifically referred to as pairs of panels 92*a*, 92*b*, 92*c*, and 92*d* as illustrated in FIG. 10 by fold lines 94. Fold lines 94 extend transversely across sheet support member 16 substantially parallel to first free transverse edge 84 and second free transverse edge 86. According to one embodiment, each one of the plurality of pair of panels 92 is divided in half by fold line 100 to define a first panel 96 on one side of fold line 100 and a second panel 98 on the other side of fold line 100. Each of first panel 96 and second panel 98 is configured to support an opposing half of one sheet member 14, as will be described in additional detail below. In one example, to facilitate coupling of sheet members 14 to sheet support member 16, adhesive 102, generally indicated in the figures with hatching, is or will be applied to exposed surface 80 of each of first panel 96 and second panel 98 in a polygonal shape substantially rectangular as each portion of adhesive 102 nears a corresponding fold line 94, but tapering toward and to a point at a center 104 of a corresponding fold line 100. As such, adhesive 102 on first panel 96 is symmetrical about fold line 100 to adhesive 102 on second panel 98 such that adhesive 102 on first panel 96 abuts adhesive 102 on second panel 98 only at center 104. In one example, such as that illustrated in FIG. 10, the shape that adhesive 102 is applied to each pair of panels 92 leaves triangular voids or non-adhesive coated portions 106 mirroring each other about a longitudinal center line (not illustrated) of sheet support member 16.

Figure 11:
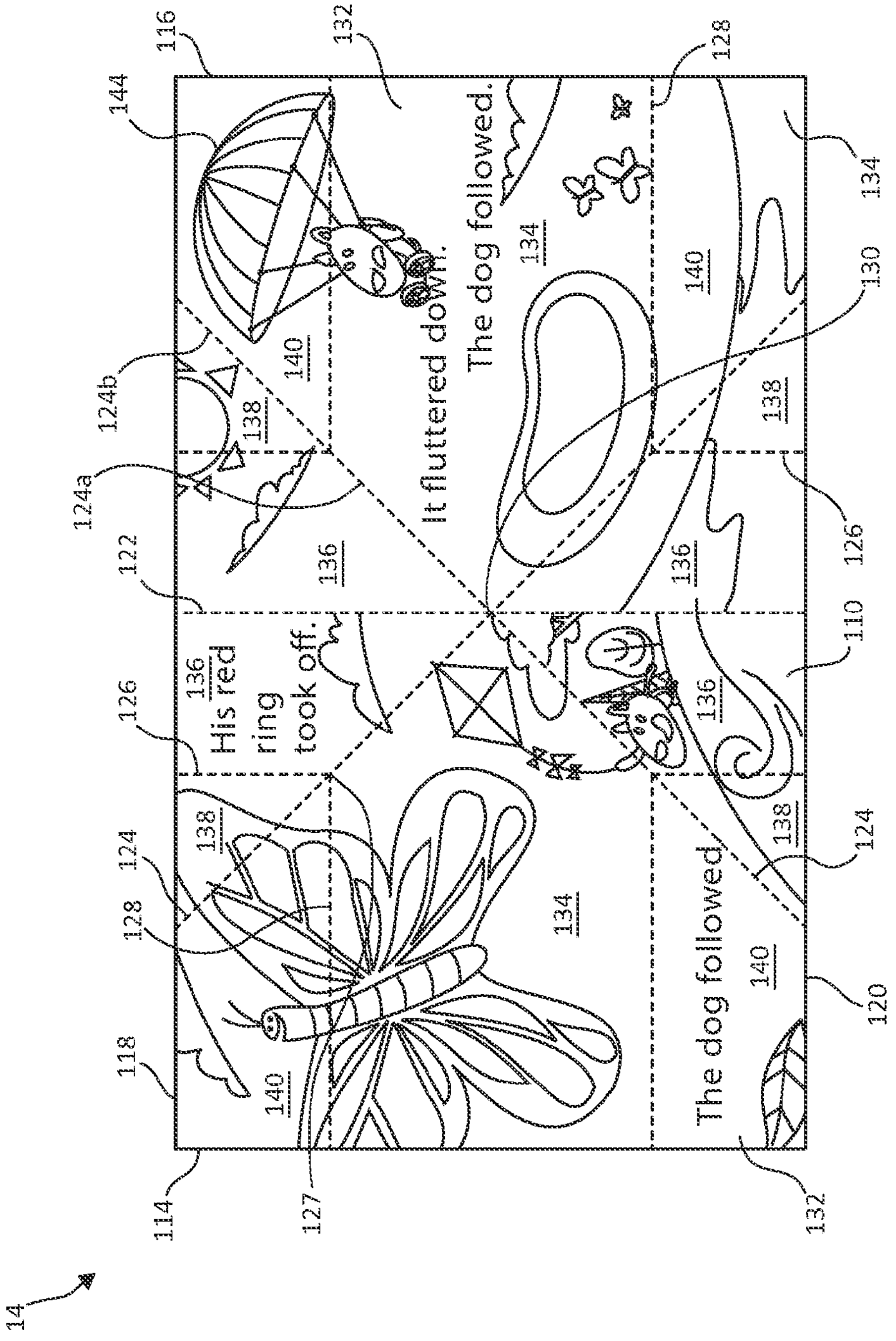
FIG. 11 is a top view illustration of an unfolded sheet member of the transaction product of FIG. 1, according to one embodiment of the present invention.

FIG. 11 illustrates one embodiment of one sheet member 14. Sheet member 14 is formed as a relatively thin, planar sheet material such as paper, cardstock, plastic, a composite thereof, or other suitable material to form an illustrated surface 110 and an opposite surface 112 (see, e.g., FIG. 7). In one example, sheet member 14 is rectangular although other shapes are also contemplated. Sheet member 14 as illustrated defines a first transverse or side edge 114, a second transverse or side edge 116 opposite first side edge 114, a first longitudinal or rear edge 118, and a second longitudinal or front edge 120. Rear edge 118 and front edge 120 each extend between first side edge 114 and second side edge 116 opposite one another. In one example, each of first side edge 114, second side edge 116, rear edge 118, and front edge 120 are substantially linear.

Sheet member 14 is pre-folded to form well-defined fold lines such that when folded over itself, sheet member 14 automatically folds along the predefined lines to form a more compact version of sheet member 14, e.g., a folded configuration of sheet member 14. In one embodiment, sheet member 14 defines a center fold line 122 transversely extending across sheet member 14 from rear edge 118 to front edge 120 dividing sheet member 14 into to symmetrically formed and folded halves 132. A diagonal fold line 124 is formed at an angle of approximately 45 degrees from center fold line 122 and extends from and between rear edge 118 and front edge 120 through center 130 of sheet member 14, and therefore, intersecting center fold 122. A diagonal fold line 124 is defined on each side of center fold line 122 in a symmetrical manner.

Sheet member 14 additionally includes a transverse fold line 126 extending from one of rear edge 118 or front edge 120 at a position between, for example, substantially half way between, center fold line 122 and a corresponding diagonal fold line 124 toward, but not to, the other of rear edge 118 and front edge 120. Transverse fold line 126 extends substantially parallel to center fold line 122 until it intersects or contacts diagonal fold line 124 at an intersection point 127. In one example, two transverse fold lines 126 each extend from rear edge 118, and two transverse fold lines 126 each extension front edge 120, two transverse fold lines 126 on each side of center fold line 122. Sheet member 14 further defines longitudinal fold lines 128 each extending from first side edge 114 or second side edge 116 toward, but not to, the other of first side edge 114 and second side edge 116 until each longitudinal fold line 128 hits intersection point 127 along diagonal fold line 124. In one example, each longitudinal fold line 128 extends substantially perpendicularly relative to center fold line 122. In one example, two longitudinal fold lines 128 extend into sheet member 14 from each of first side edge 114 and second side edge 116, each of the two longitudinal fold lines 128 is spaced from a longitudinal center line (not illustrated) of sheet member 14 an equal distance and is positioned on an opposite side of such a longitudinal center line as compared to the other of the two longitudinal fold lines 128. In one embodiment, each diagonal fold line 124 is divided into a first portion **124*a*, which extends from a corresponding one of rear edge 118 and front edge 120 to a corresponding intersection point 127, and a second portion 124*b*, which extends from intersection point 127 through center 130 to another intersection point 127 on diagonal fold 124 in an opposite quadrant of sheet member 14**.

The configuration of fold lines 122, 124, 126, and 128 divides sheet member 14 into various portions. More particularly, sheet member 14 forms static portions 134 that will be adhered or otherwise statically coupled directly to sheet support member 16 between two adjacent longitudinal fold lines 128 and opposing diagonal fold lines 124 such that static portion 134 extends from one of first side edge 114 and center 130 and second side edge 116 and center 130 opposite and symmetrically to one another. Four center portions 136 of sheet member 14 are formed and each extend between center fold line 122 and a corresponding transverse fold line 126 from one of rear edge 118 and front edge 120 to a length of second portion **124*b* of diagonal fold line 124 extending between a corresponding intersection point 127 and center 130. Sheet member 14 defines transition portions 138 each on an opposite side of one of center portions 136 relative to center fold line 122. Each of the four transition portions 138 is triangular and extends from transverse fold line 126 in an opposite direction as center portion 136 to first portion 124*b* of a corresponding diagonal fold line 124. Finally, sheet member 14 defines four longitudinal portions 140 each extending from first portion 124*b* of a corresponding diagonal fold line 124 opposite transverse portion 138 to the corresponding one of first side edge 114 and second side edge 116**.

Figure 12:
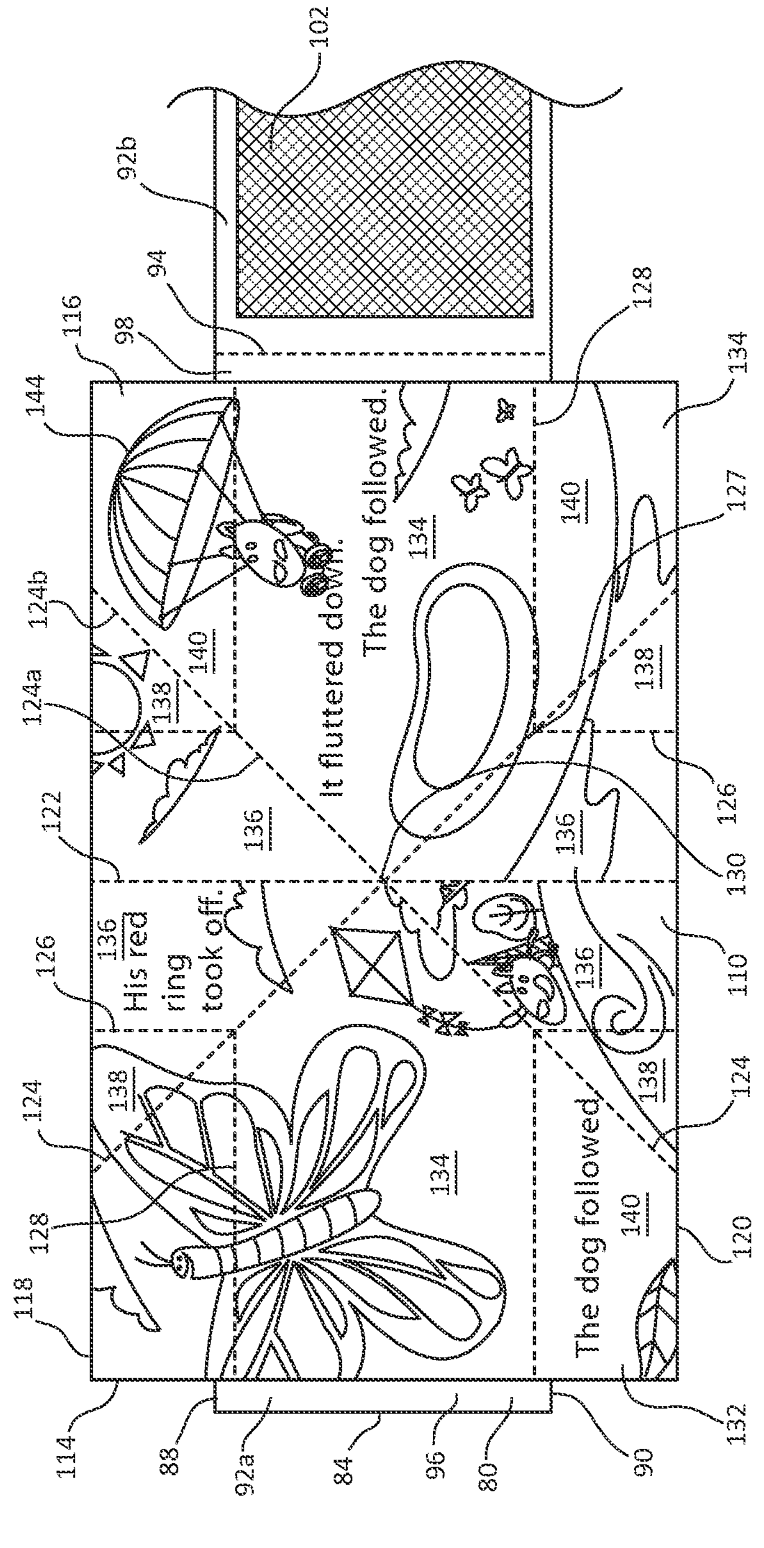
FIG. 12 is a top view illustration of a portion of the sheet support member of FIG. 10 coupled to the sheet member of FIG. 11, according to one embodiment of the present invention.

During assembly, one sheet member 14 is applied to each of the plurality of the pair of panels 92, for instance pair of panels **92*a* as illustrated in FIG. 12. More specifically, center 130 of sheet member 14 is aligned with center 104 of pair of panels 92*a*, which aligns each static portion 134 of sheet member 14 with adhesive 102 applied to pair of panels 92*a*, for example, one static portion 134 is adhered to first panel 96 of pair of panels 92*a* and the other static portion 134 is adhered to second panel 98 of pair of panels 92*a*. In one embodiment, only static portions 134 of sheet member 14 are directly adhered and maintained statically positioned relative to pair of panels 92*a*. Other portions 136, 138, and 140 are able to rotate about corresponding fold lines relative to static portions 134. As illustrated, upon coupling sheet member 14 to pair of panels 92*a*, fold line 122 of sheet member 14 is aligned with and extends directly over fold line 100 of pair of panels 92*a***.

Figure 7:
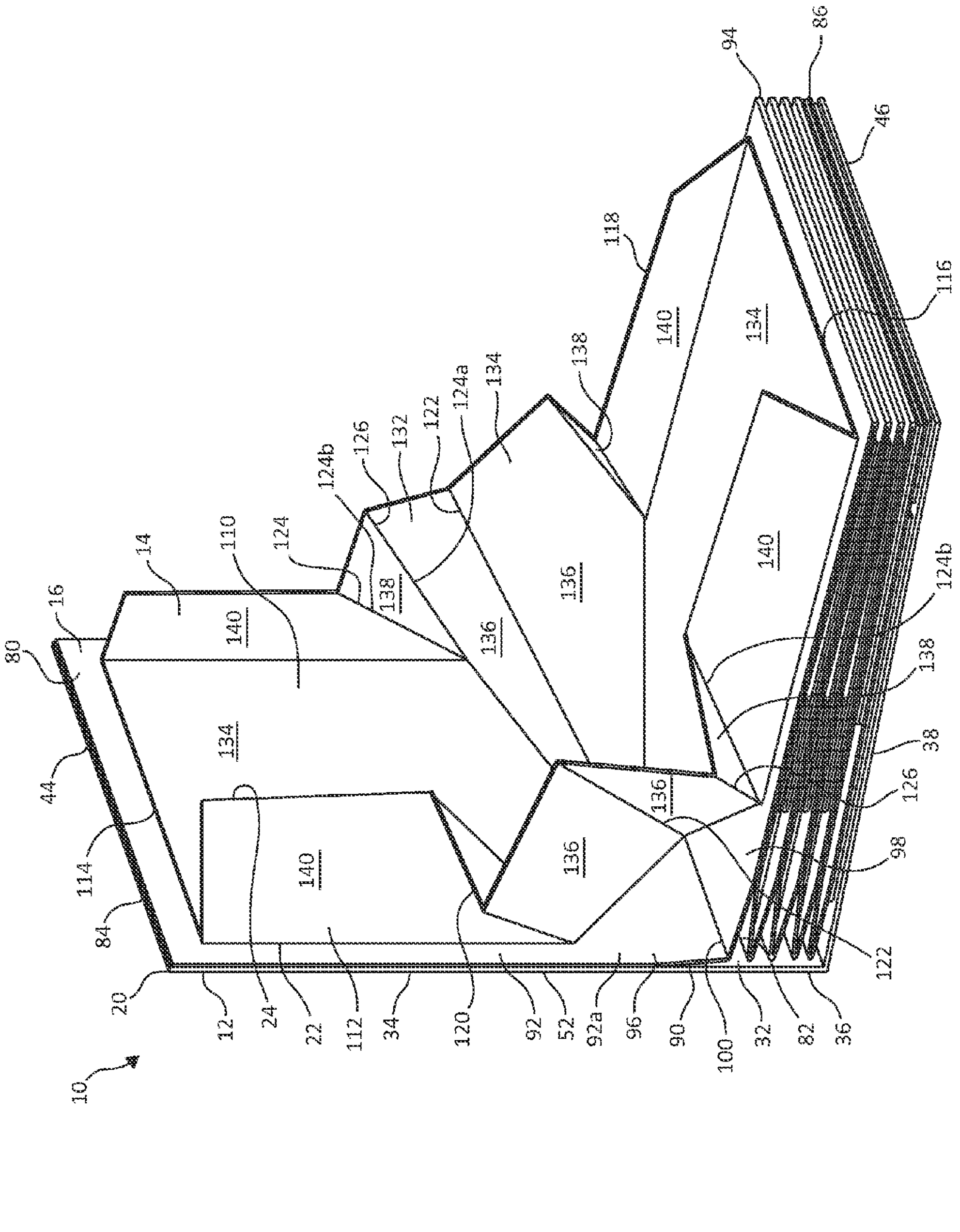
FIG. 7 is a front perspective view illustration of the transaction product of FIG. 1 in a partially opened configuration, according to one embodiment of the present invention.

Additionally referring to FIG. 7, when one of the plurality of the pair of panels 92, such as pair of panels **92*a*, is folded about fold line 100 to move exposed surface 80 defined by first panel 96 toward exposed surface 80 defined by second panel 98, sheet member 14 is folded about fold lines 122, 124, 126, and 128 to fold over itself placing various portions of illustrated surface 110 in contact with other portions of illustrated surface 110 and eventually positioning sheet member in a compact folded configuration as illustrated in FIGS. 1-6**.

Figure 8:
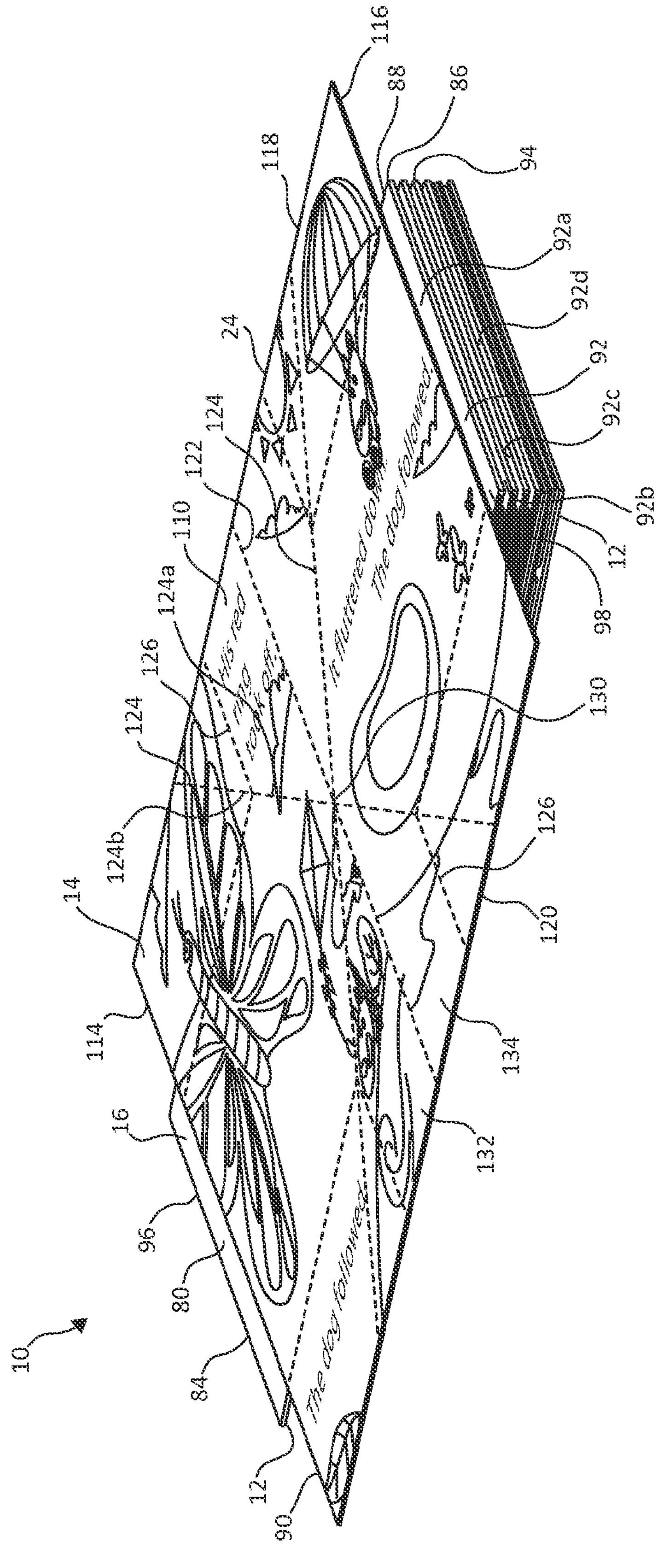
FIG. 8 is a front perspective view illustration of the transaction product of FIG. 1 in a first fully opened configuration, according to one embodiment of the present invention.
Figure 9:
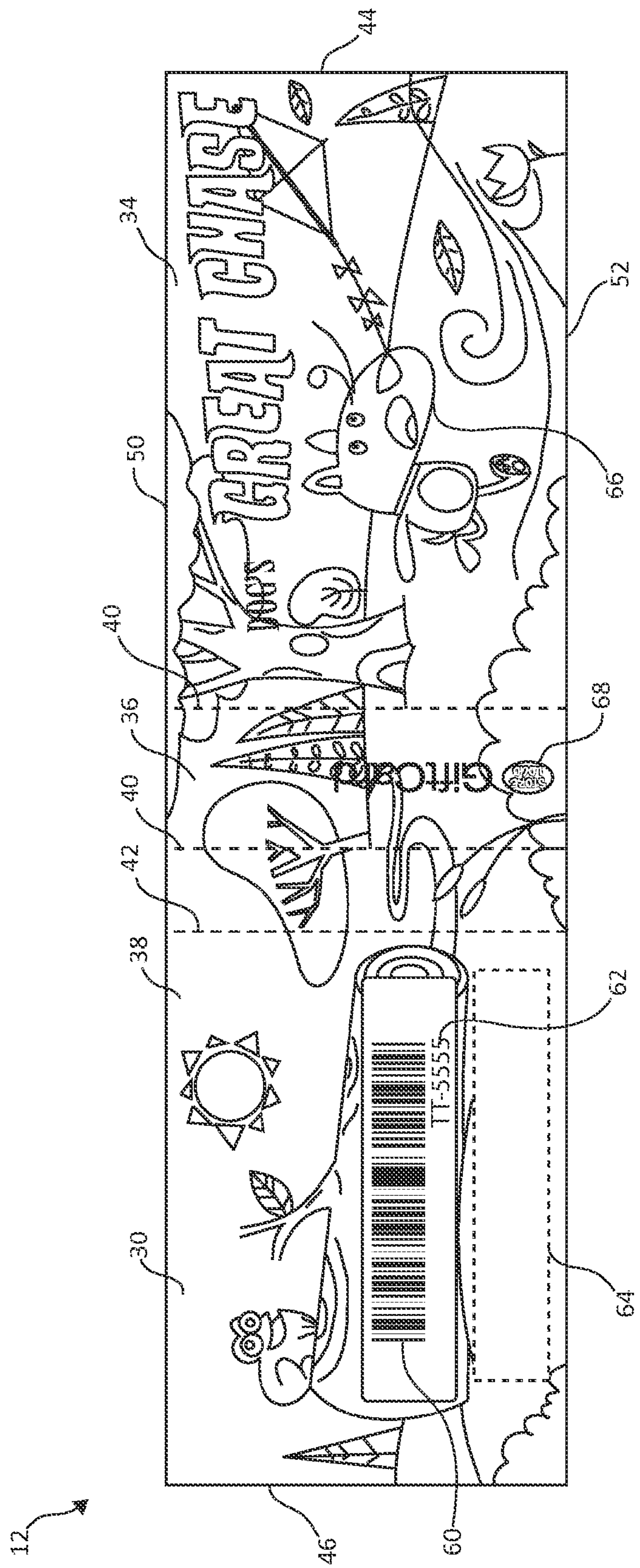
FIG. 9 is a top view illustration of an unfolded cover of the transaction product of FIG. 1, according to one embodiment of the present invention.

More particularly, referring to FIG. 12 in view of FIG. 7, which is illustrated without decoration indicia 144, etc. on illustrated surface 110 for clarity, when moving from the unfolded configuration of FIG. 8 toward the folded configuration of FIGS. 1-6, longitudinal portions 140 of sheet member 14 are folded about corresponding longitudinal fold lines 128 inwardly toward the corresponding static member 134. Similarly, each center portion 136 is also folded inwardly toward the corresponding static member 134, but about a portion of corresponding diagonal fold line 124 extending between an adjacent intersection point 127 and center 130. To accommodate such folding, sheet member 14 folds outwardly about portions of center fold line 122 on opposite sides of center 130 to place opposite surface 112 defined by one center portion 136 in a position abutting the portion of opposite surface 112 defined by an immediately adjacent center portion 136 (i.e., a center portion 136 on the opposite side of center fold line 122). Also to accommodate the other above described folding, sheet member 14 folds outwardly about first portions **124*a* of diagonal fold line 124 to place portions of opposite surface 112 defined by transverse portion 138 and longitudinal portion 140** in direct contact with one another.

As such, according to the above-described embodiment, portions of sheet member 14 that extend rearwardly from the rearmost longitudinal fold line 128 fold over a remainder of a rearmost half of sheet member 14, and portions of sheet member 14 that extend forwardly from the foremost longitudinal fold lines 128 fold over a remainder of a foremost half of sheet member 14. This folding effectively creates an accordion inspired but modified folding of sheet member 14 such that when first panel 96 and second panel 98 of pair of panels **92*a* are subsequently rotated away from one another about fold line 100, static portions 134 are rotated away from one another about center fold line 122, which is positioned directly over fold line 100. Rotation of static portions 134 away from one another pulls other portions of sheet member 14 away from one another resulting in the automatic unfolding of sheet member 14**.

As shown in FIGS. 1-6, when sheet member 14 is in the folded configuration, folded sheet member 14 is maintained entirely within a footprint of pair of panels **92*a* and outer perimeter edge 22 of folded sheet member 14 is inwardly inset from an outer perimeter of pair of panels 92*a* and, similarly from outer perimeter edge 20 of cover 12. Conversely, when pair of panels 92*a* is opened and sheet member 14 is unfolded at least the two longitudinal edges, i.e., rear edge 118 and front edge 120, extend beyond and outwardly offset from corresponding rear edge 88 and front edge 90 of sheet support member 16 and, similarly extend beyond and outwardly offset from corresponding rear free edge 50 and front free edge 52 of cover 12. When in the unfolded configuration, decorative indicia 144, for example, text and/or graphics presenting a portion of a story, introducing games or written activities, etc. and any brand indicia that may be incorporated therein and applied to illustrated surface 110 is fully viewable. In one embodiment, when sheet member 14 is unfolded, sheet member 14 is substantially planar and extends substantially parallel to, and in one embodiment, directly adjacent, exposed surface 80 of pair of panels 92***a*.

Where one sheet member 14 is described above as being attached to pair of panels 92*a*, it should be understood that separate other ones of sheet members 14 are applied to each pair of panels 92*b*, 92*c*, and 92*d* in a similar manner. Either before or after sheet members 14 are secured, e.g., adhered, to sheet support member 16, sheet support member 16, more particularly, a portion of internal surface 82 of the one of first panels 96 thereof is secured, e.g., adhered, to interior surface 32 of cover 12, more particularly, of top panel 34 of cover 12, as shown with additional reference to FIGS. 13 and 14. Sheet support member 16 is folded in accordion-like fashion, i.e., alternating fold directions between fold lines 94 and fold lines 100, stacking panels 96 and 98 of the plurality of pairs of panels 92 on top of one another above top panel 34 of cover 12. In one embodiment, bottom panel 38 of cover 12 is rotated upwardly and adhered or otherwise secured to internal surface 82 of the last second panel 98 of sheet support member 16 (not shown). However, in the illustrated embodiments, one or more additional components of transaction product 10 are coupled between bottom panel 38 of cover 12 and internal surface 82 of the last second panel 98.

Figure 13:
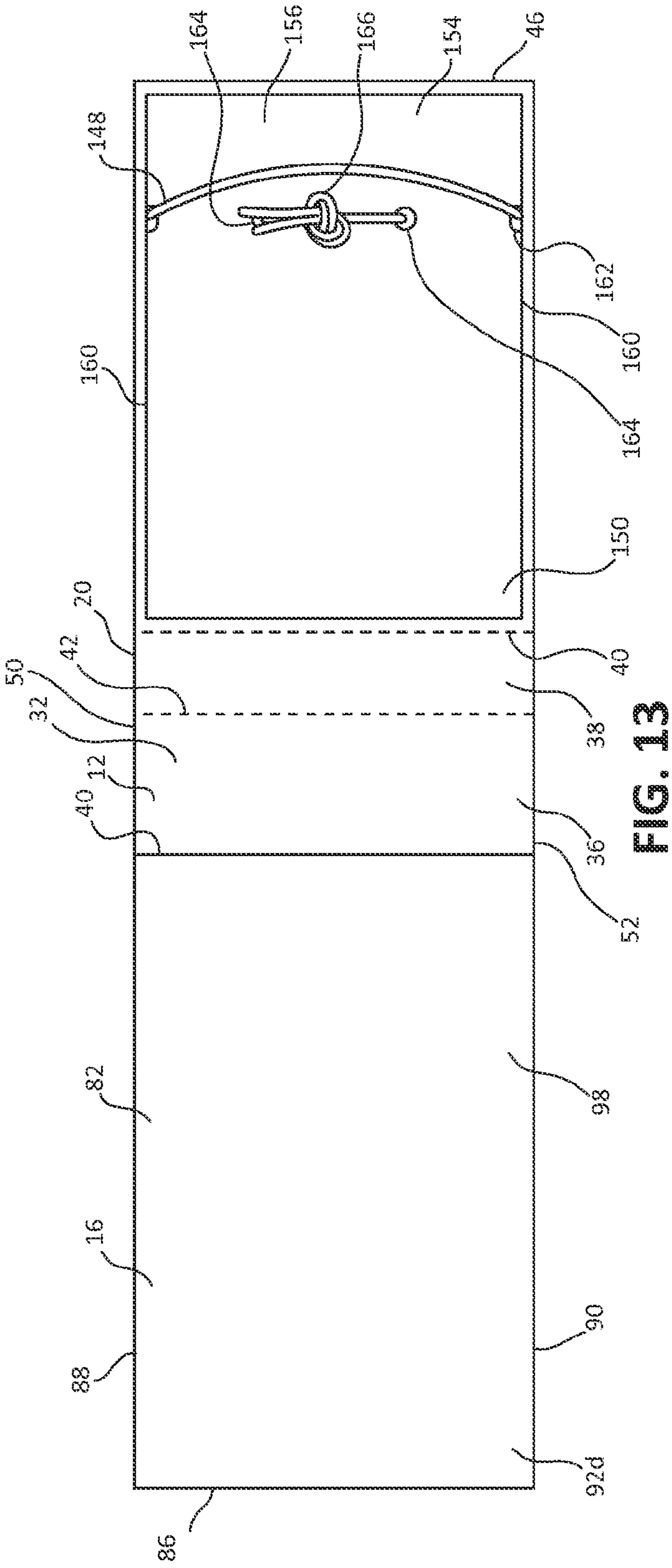
FIG. 13 is a top view illustration of a partially assembled transaction product assembly including the cover, the sheet support member, string, and a string retention member, according to one embodiment of the present invention.
Figure 14:
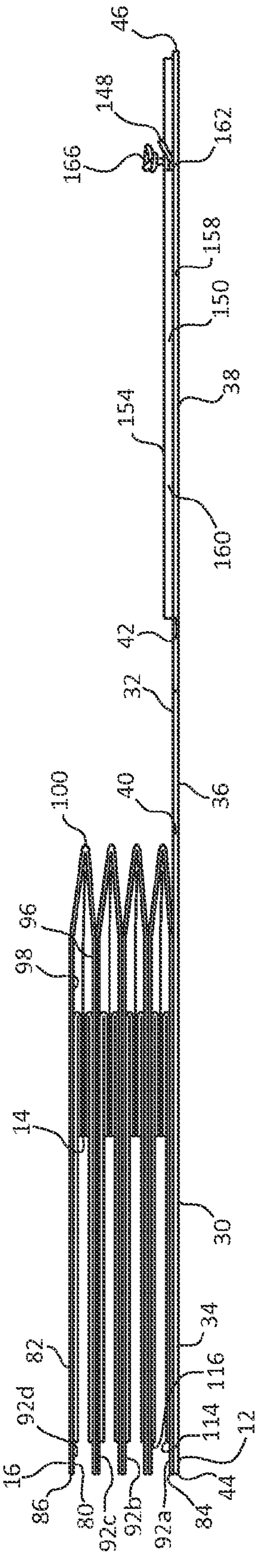
FIG. 14 is a front view illustration of the partially assembled transaction product of FIG. 13, according to one embodiment of the present invention.
Figure 15:
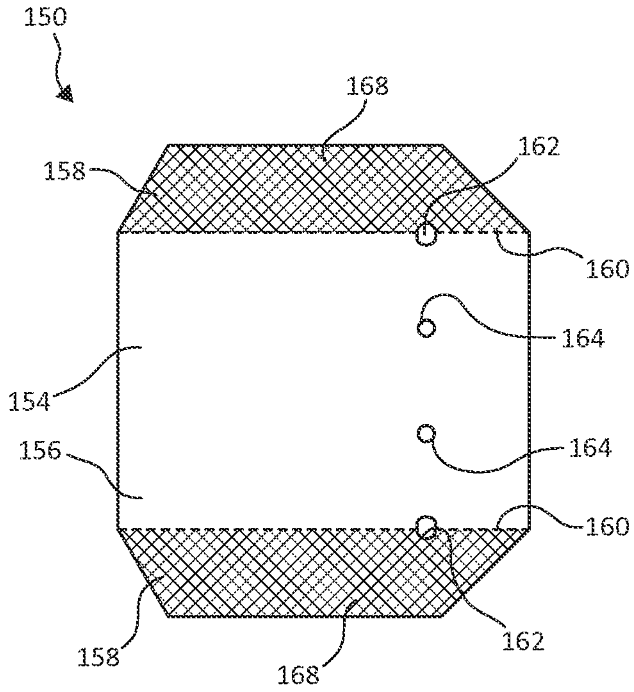
FIG. 15 is a top view illustration of an unfolded string to retention member of the transaction product of FIG. 1, according to one embodiment of the present invention.

For example, as illustrated in FIGS. 13-15, transaction product 10 includes a string 148 and a string-retention member 150. String 148 is elastomeric and configured to selectively be placed around at least a portion of transaction product 10 to maintain transaction product 10 in a closed or fully folded configuration. In one embodiment, string-retention member 150 is formed as a single piece of substantially planar, sheet stock material formed of, for example, paper, cardstock, plastic, or suitable composite. String-retention member 150 includes an exposed or first surface 154 and a internal or second surface (not shown) opposite first surface 154. Additionally, string-retention member 150 includes a primary panel 156, which is substantially rectangular in the illustrated embodiment, and two edge panels 158 extending away from opposite and longitudinal edges of primary panel 156. Longitudinally extending fold lines 160 extend between and along the boundary between primary panel 156 and each of the two edge panels 158.

In one embodiment, apertures 162 are formed through string-retention member 150 through fold line 160 such that a portion of each aperture 162 is formed by each of primary panel 156 and an adjacent edge panel 158. Primary panel 156 additionally independently defines two or more apertures 164 spaced from one another with all apertures 162 and 164 being linearly aligned and collectively extending transversely across string-retention member 150 nearer one edge thereof in one embodiment. As shown in FIGS. 13 and 14, string 148 is thread through apertures 162 and 164. More particularly, in one embodiment, string 148 is laid across first surface 154, the opposing ends of string 148 are thread through opposing apertures 162 and then back through a different one of apertures 164. Ends of string 148 thread back through apertures 164 are secured to one another, for example, forming a knot 166 in string 148.

Once string 148 is positioned, edge panels 158 of string-retention member 150 are folded rearwardly about fold lines 160 toward second surface (not shown) of string coupling member 150. Adhesive 168 (see FIG. 15) applied to first surface 154 of edge panels 158 is used to directly or otherwise secured string-retention member 150, more particularly, edge panels 158 to a portion of interior surface 32 of cover 12 defined by bottom panel 38. Once string-retention member 150 is secured to cover 12, when cover 12 is closed, the portion of string 148 extending over first surface 154 of string-retention member 150 between apertures 162 can be stretched around sheet members 14, sheet support members 16, and top panel 34 of cover 12 to hold transaction product 10 and, therefore, cover 12 in the closed position as shown in FIGS. 1-6.

In one example, transaction product 10 includes glasses 180 for viewing decorative indicia 144 on sheet members 14. More particularly, in one embodiment, decorative indicia 144 include 3D graphics and/or text presentations, and glasses 180 are 3D viewing glasses. Other viewing glasses 180 are also contemplated such as reading or magnifying glasses, decoding glasses, etc. as will be apparent to those of skill in the art upon reading the present application. In the illustrated embodiments, glasses 180 are formed from a planar or sheet material of cardstock, paper, cardboard, plastic, composite, or other suitable material. Glasses 180 include a front member 220 and temples or bows 222 each rearwardly extending from an opposite end of front member 220. Front member 220 is configured to extend across the user's face, over the user's eyes, and includes a nose-reception cut out 226 forming a bridge just above nose-reception cut out 226. Two apertures 228 are formed through front member 220, each on an opposite side of nose-reception cutout 226. Each aperture 228 receives and/or is covered with a lens 230 to alter the vision of a user looking through glasses 180. In one embodiment, glasses 180 are formed of a two or more-ply material and each lens 230 is interposed and secured between two of the plys to secure each lens 230 to front member 220. In one embodiment, a fold line 232 is defined transversely across the middle of front 220 of glasses 180 to facilitate possible storage within cover 12 as will be further described below.

Front 220 defines a first end 236 and an opposite second end 238. One bow 222 extends from each of first end 236 and second end 238 and forms an earpiece 240 opposite front 220 for fitting over and partially around an ear of a user to help secure glasses 180 to a user's head. In one embodiment, each bow 222 is configured to rotate about the respective end 236 or 238, e.g., by folding the primary material forming glasses 180. In one embodiment, a transverse fold line 242 is formed through each bow 22 to facilitate placement within cover 12 as will be further described below.

In one example, additional features are formed by glasses 180 to increase their appeal to users. In the illustrated embodiment, for instance, ears 244 such as dog or cat ears extend upwardly from a top edge of front 222. Ears 244 may correspond to decorative indicia 66 and/or 144 such that the various portions of glasses 180 conform to a theme or story. For example, where decorative indicia 66 and/or 144 depicts a dog as part of the story presented on sheet members 14, glasses 180 include ears 244 to look like a similar or visually corresponding dog. In one embodiment, ears 244 include first ear portion 250, second ear portion 252, third ear portion 254, and fourth ear portion 256 each separated from at least one adjacent one of first ear portion 250, second ear portion 252, and third ear portion 254 by a fold line 258. First ear portion 250 extends in a common plane with front 220, and fourth ear portion 256 extends in a common plane with a corresponding one of bows 222. Second ear portion 252 is fold rearwardly from and to extend substantially perpendicularly to first ear portion 250. Third ear portion 254 extends from second ear portion 252 substantially parallel to first ear portion 250 to intersect with fourth ear portion 256 along a corresponding fold line 258. As such, one ear 244 is configured to extend upwardly from each corner of glasses 180 collectively defined by front 220 and one bow 222. In one embodiment, indicia are added to ears 244 to further liken the structure to a dog's ear, etc.

Glasses 180 are foldable to a more nearly or substantially planar configuration for placement within transaction product 10, according to one embodiment. As such, second and third ear portions 252 and 254 are folded outwardly to align with the corresponding glasses corner. Then, ear portions 250 and 252 are folded downwardly about fold line 260, as generally indicated by arrow 264, and ear portions 254 and 256 are folded downwardly about fold line 262, as generally indicated by arrow 166. Bows 222 are then folded inwardly about corresponding ends 236 and 238 of front 220 to form glasses 180 as more nearly planar in their folded configuration.

Figure 16:
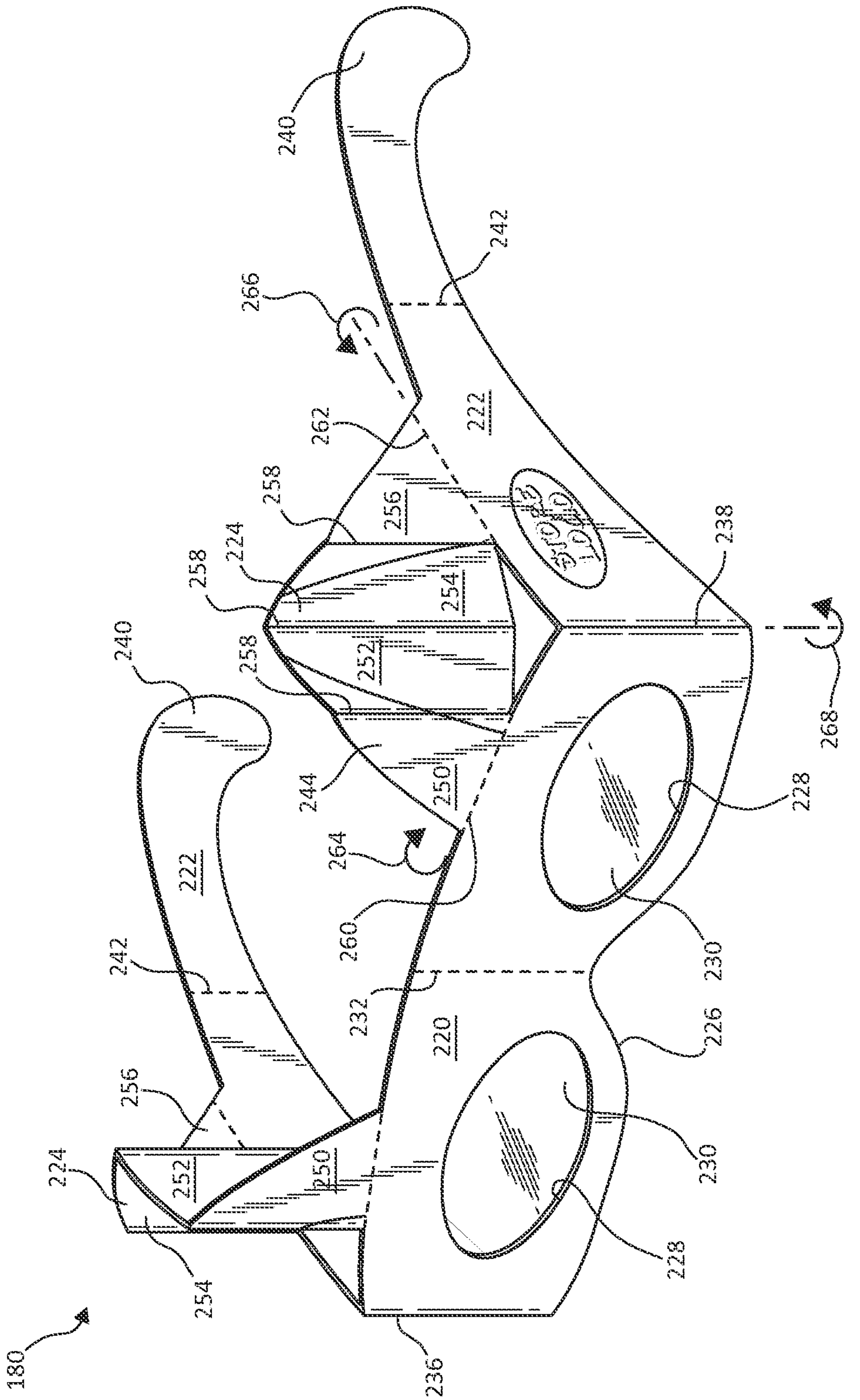
FIG. 16 is a top perspective view illustration of unfolded glasses for viewing indicia on at least the sheet member of FIG. 11, according to one embodiment of the present invention.

In one embodiment, transaction product 10 includes a glasses reception structure including primary member 182 and two pocket members 200 as generally illustrated in FIGS. 18-22. Referring to FIG. 16, primary member 182 is substantially planar and defines a first surface 184 and a second surface 186 (FIG. 21) opposite first surface 184. Although illustrated and primarily described as being formed separately from sheet support member 16, in one embodiment, primary member 182 is formed as part of the same piece as sheet support member 16, extending from second free transverse edge 86 of sheet support member 16. In one example, primary member 182 is substantially rectangular and defines transverse edges 188, which are positioned opposite one another, and longitudinal edges 190 positioned opposite one another and each extending between transverse edges 188. A fold line 192 extends transversely through the middle of primary member 182 dividing primary member 182 into two panels.

Figure 17:
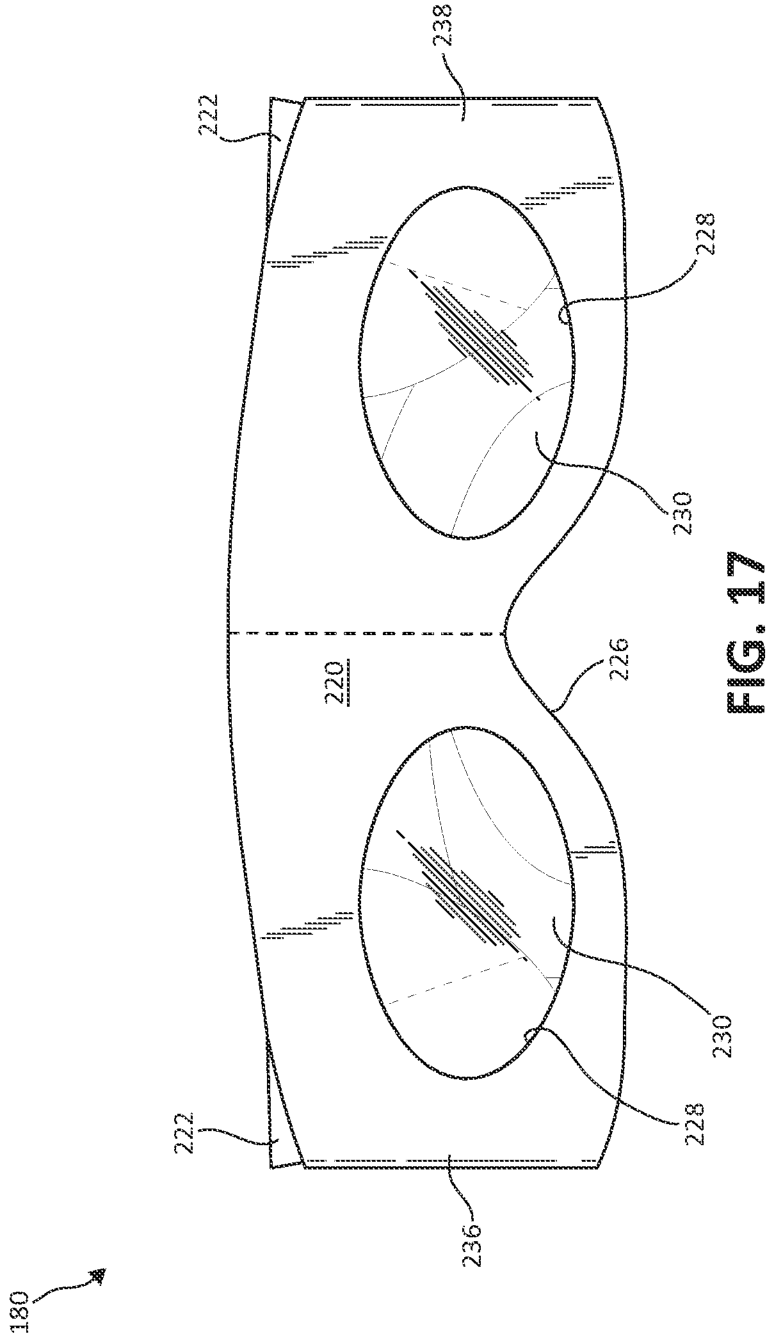
FIG. 17 is a top view illustration of the glasses of FIG. 16 in a folded configuration, according to one embodiment of the present invention.
Figure 18:
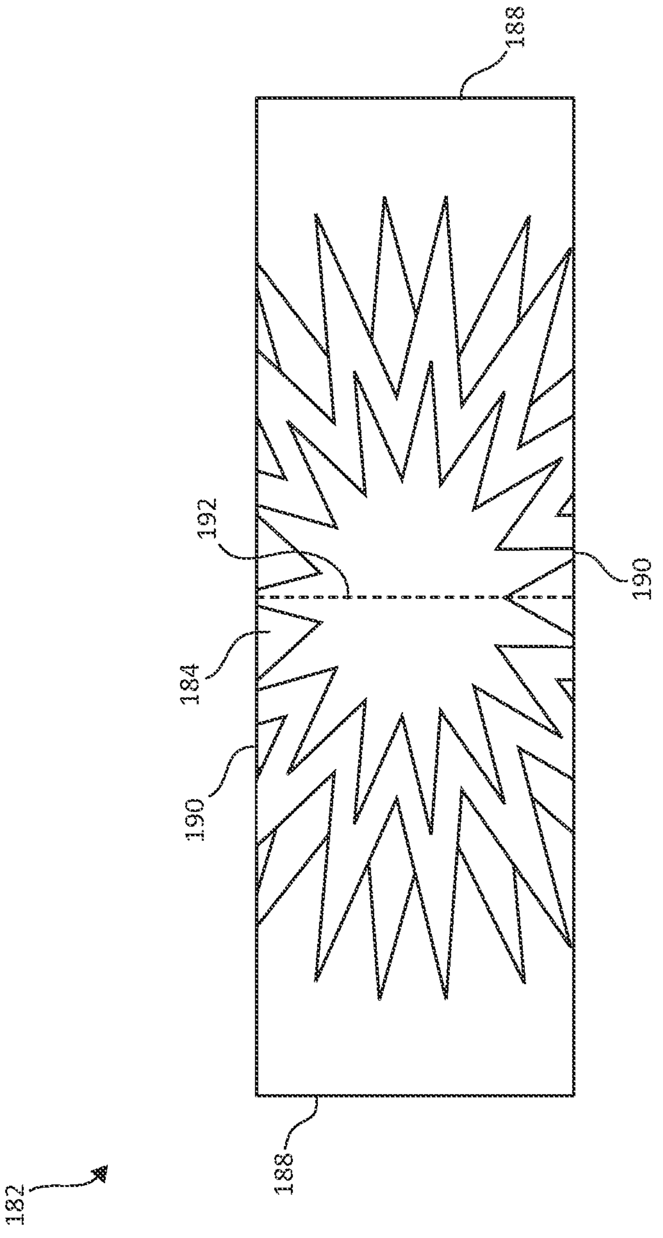
FIG. 18 is a top view illustration of a pocket support member, according to one embodiment of the present invention.
Figure 19:
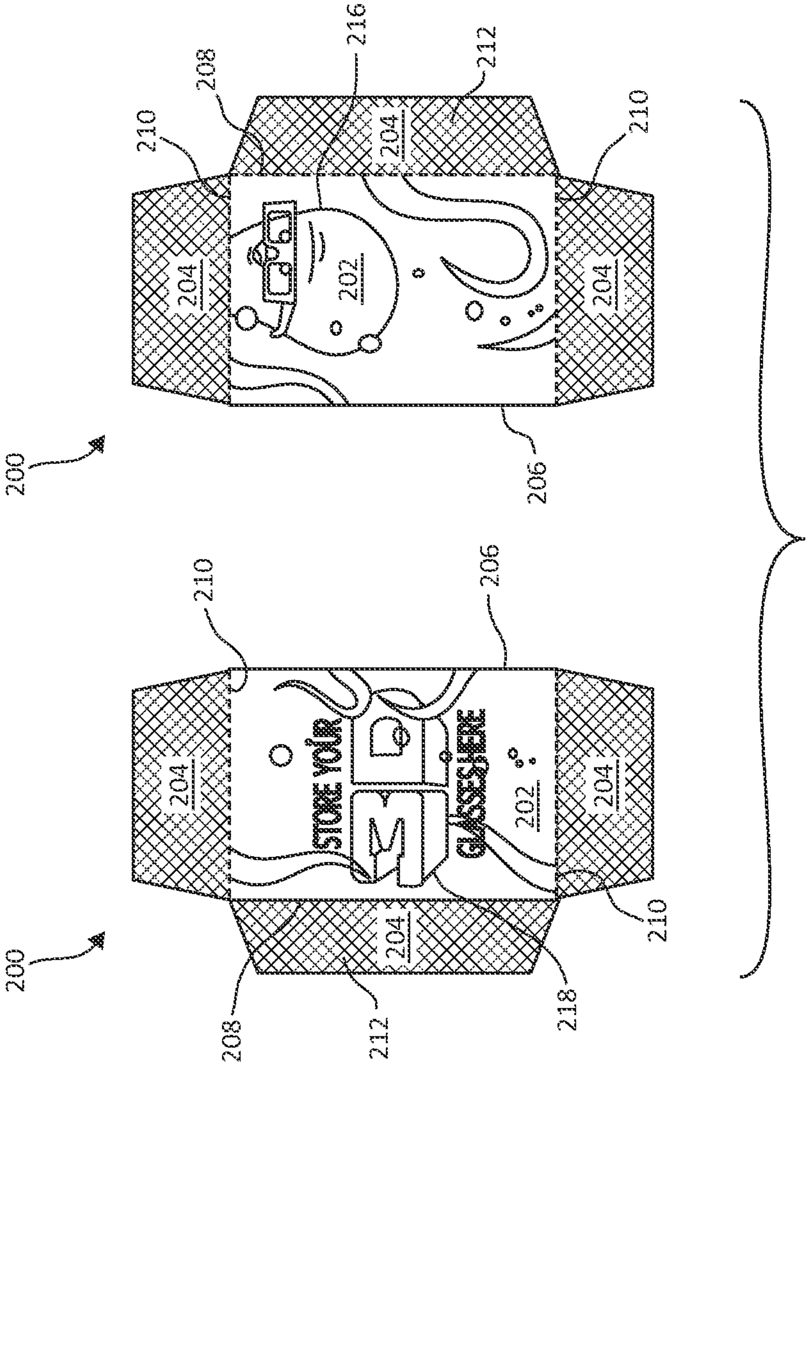
FIG. 19 is a top view illustration of two unfolded pocket members, according to one embodiment of the present invention.
Figure 20:
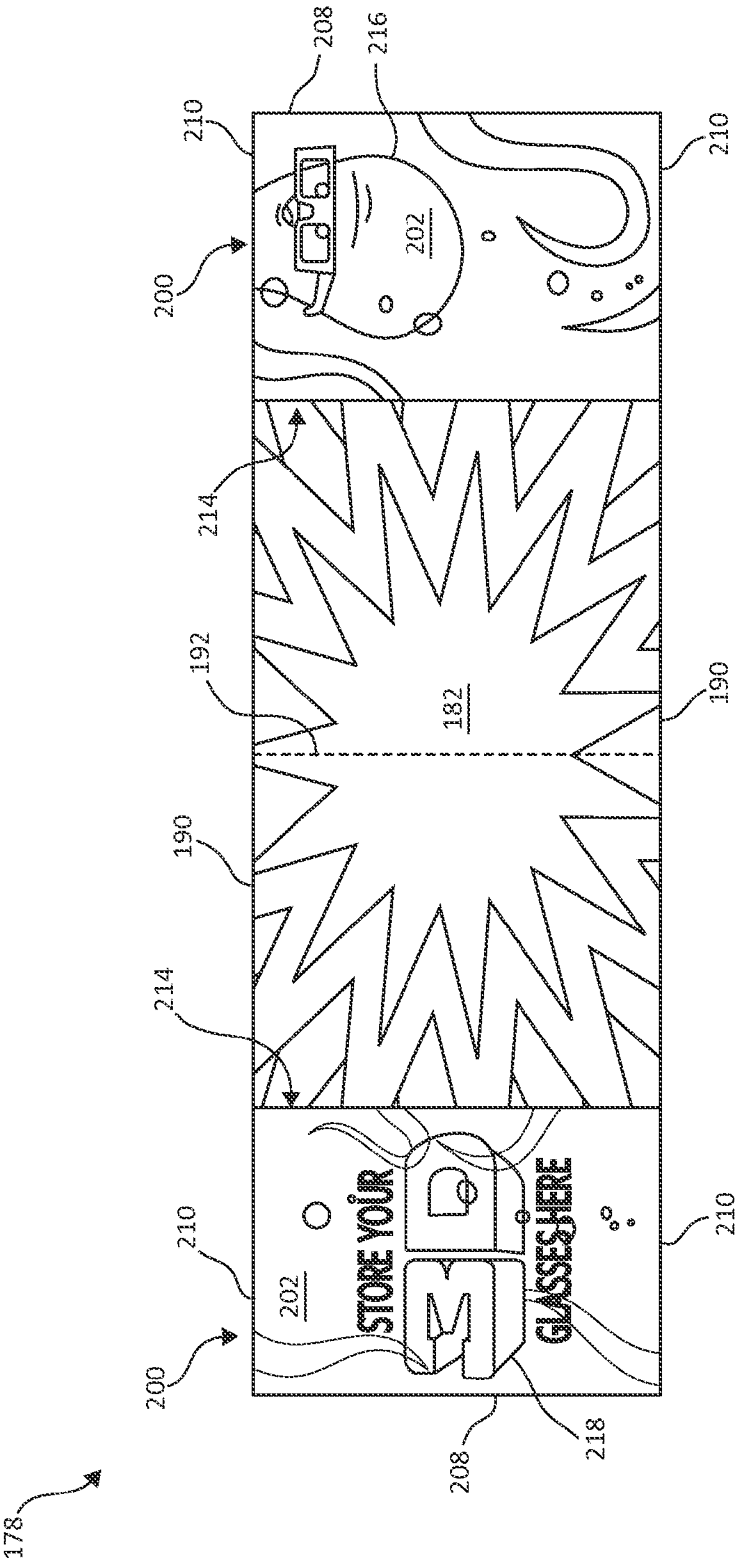
FIG. 20 is a top view illustration of the pocket support member of FIG. 18 and the two pocket members of FIG. 19 coupled to one another, according to one embodiment of the present invention.

Pocket members 200 according to one embodiment are illustrated in FIG. 17. Each pocket member 200 includes a pocket panel 202 and pocket securement panels 204 extending around all but one, for example, three of four, sides of pocket panel 202. Fold lines 208 and 210 extend between pocket panel 202 and pocket securement panels 204. Pocket panel 202 defines an open edge 206 opposite fold line 208. Adhesive 212, generally illustrated with hatching is applied to pocket securement panels 204, and pocket securement panels 204 are folded back about a respective one of fold lines 208 and 210 to extend substantially parallel to pocket panel 202. Additionally referring to FIGS. 21 and 22, pocket securement panels 204 are adhered or otherwise coupled at opposing ends of primary member 182. For example fold line 208 of each pocket securement panel 204 is substantially aligned with a different one of transverse edges 188. Open edge 206 of one pocket securement panel 204 faces open edge 206 of the other pocket securement panel. A slot or thin cavity 214 is formed between pocket panel 202 and first surface 184. When a user desires to store glasses 180, one end of folded glasses 180 (e.g., as illustrated in FIGS. 17 and 22) is positioned in cavity 214 partially formed by one pocket panel 202 and the opposing end of folded glasses 180 is positioned in cavity 214 partially formed by the other pocket panel 202. When positioned in cavities 214, fold lines 232 and 242 of glasses 180 align with fold line 192 of primary panel 182 such that primary panel 182 with glasses 180 is readily foldable when transaction product is placed in a closed position.

Figure 21:
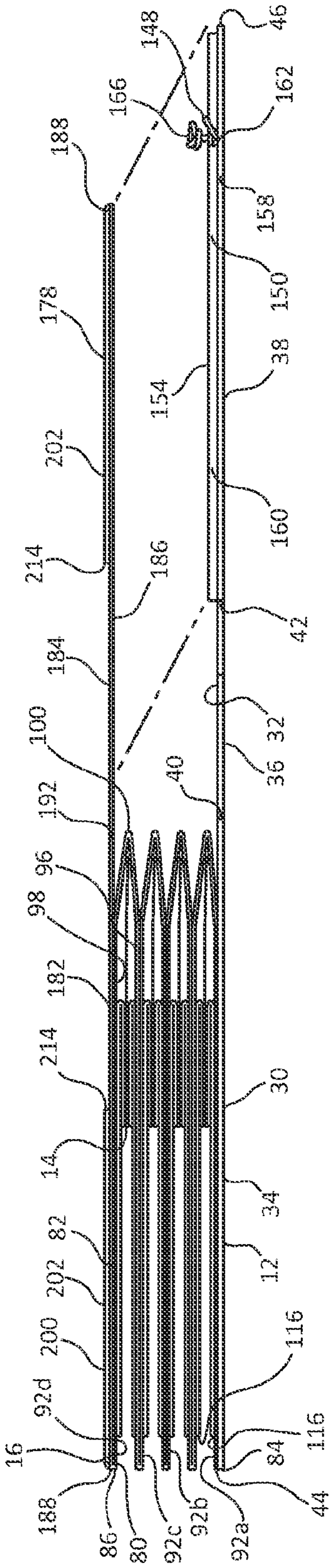
FIG. 21 is a front view illustration of a partially assembled transaction product including the cover of FIG. 9, the sheet support member of FIG. 10, the sheet members of FIG. 11, the pocket support member of FIG. 18, the two pocket members of FIG. 19 the string retention member of FIG. 15, and the string of FIG. 13, according to one embodiment of the present invention.
Figure 22:
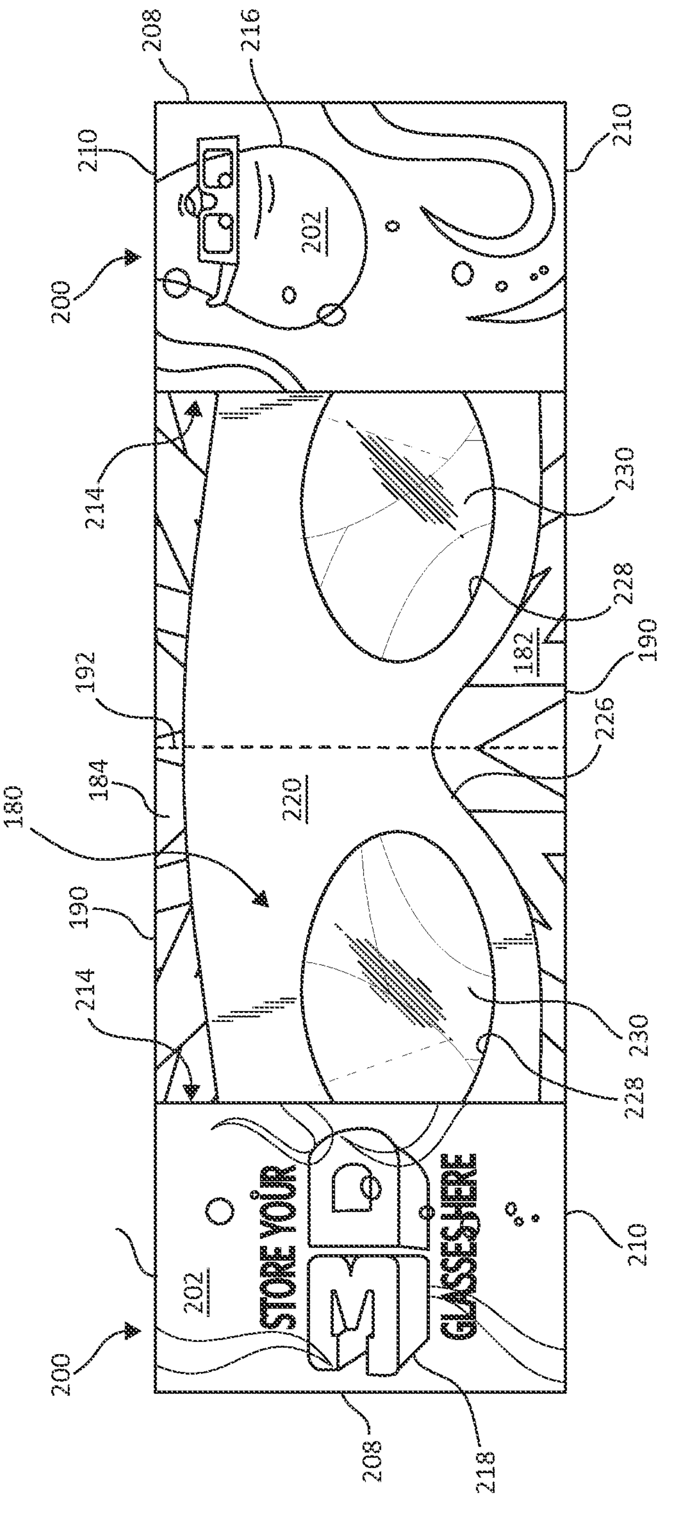
FIG. 22 is a top view illustration of the glasses of FIG. 16 positioned in pockets formed by the pocket members of FIG. 19 and the pocket support member of FIG. 18, according to one embodiment of the present invention.

Referring to FIGS. 21 and 22, primary panel 182 is positioned such that one of transverse edges 188 aligns with second free side end 86 of sheet support member 16 and a portion of second surface 186 of primary panel 182 is adhered to internal surface 82 of sheet support member 16 adjacent send free side end 86. Next, cover 12 is folded about fold line 40 and/or fold line 42 to move the other transverse edge 188 of primary panel 182 into alignment with rear free side edge 46. Another portion of second surface 186 of primary panel 182 is adhered or otherwise coupled to cover 12, or in the illustrated embodiments, string securement member 150 as indicated by the construction lines in FIG. 21 to produce the end transaction product 10 as illustrated in FIGS. 1-6.

Figure 23:
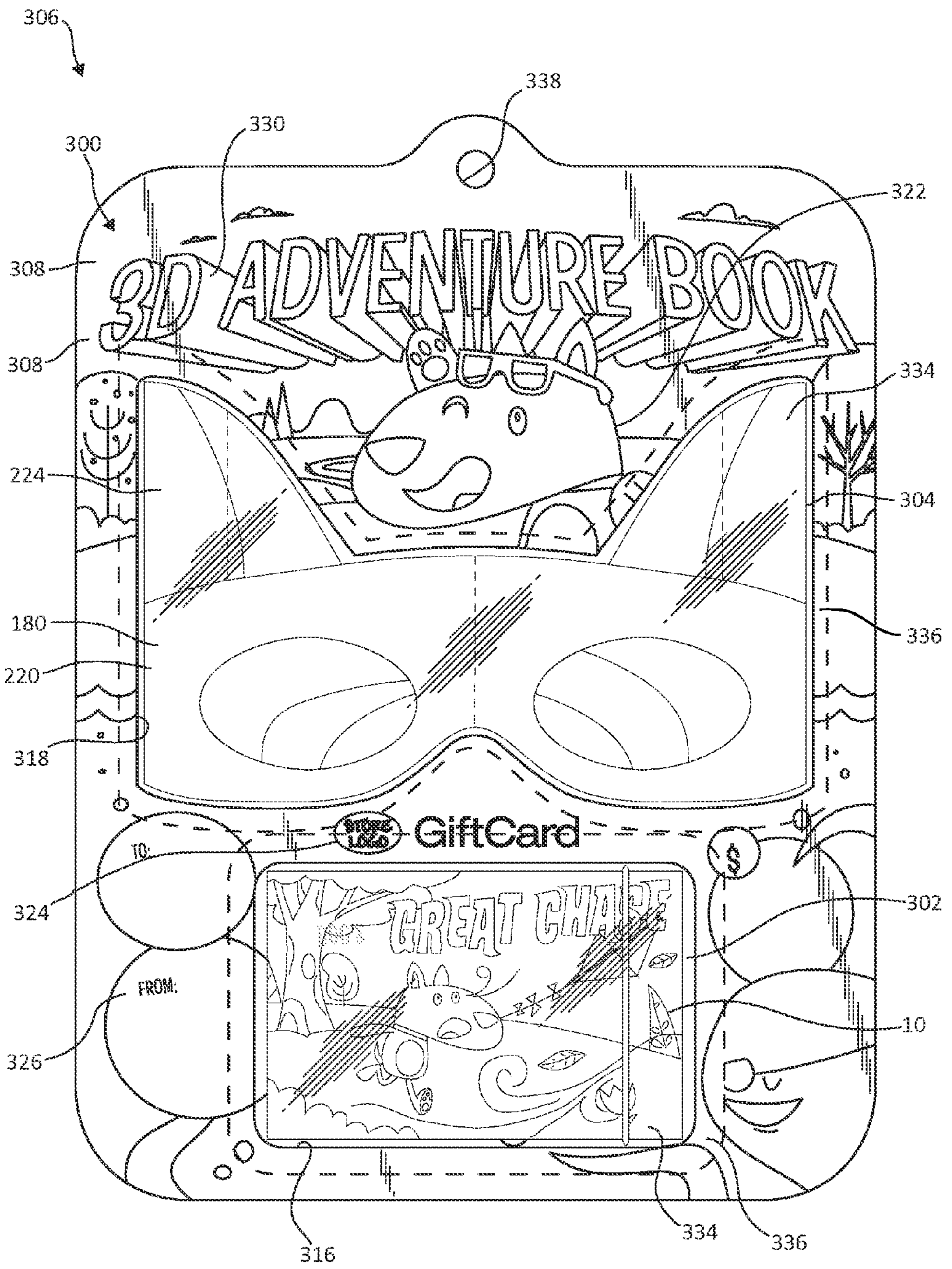
FIG. 23 is a top view illustration of a transaction product assembly including a backer with blisters for supporting the transaction product of FIG. 1, the glasses of FIG. 16, and a backer, according to one embodiment of the present invention.
Figure 24:
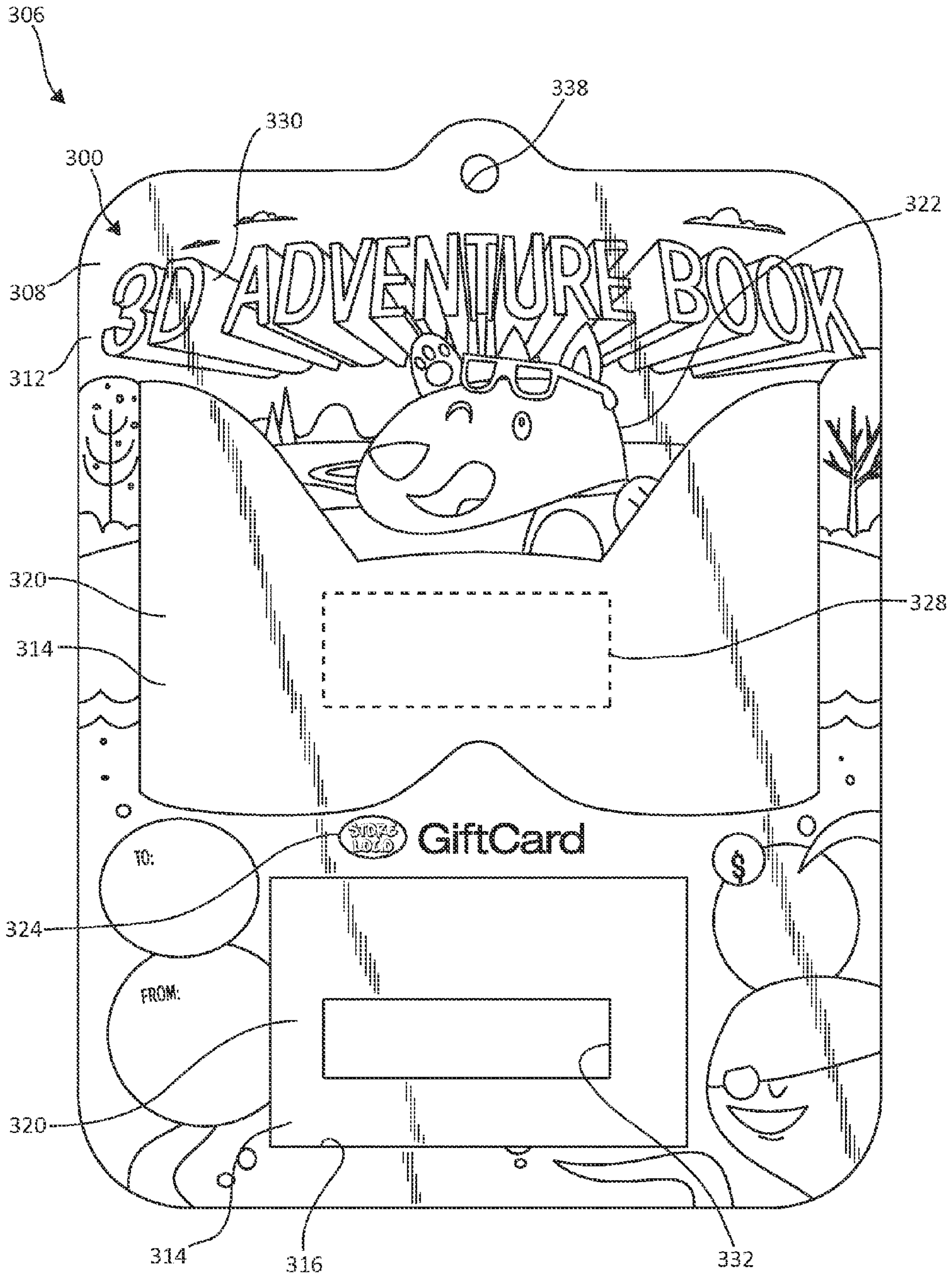
FIG. 24 is a top view illustration of the backer of FIG. 23, according to one embodiment of the present invention.
Figure 25:
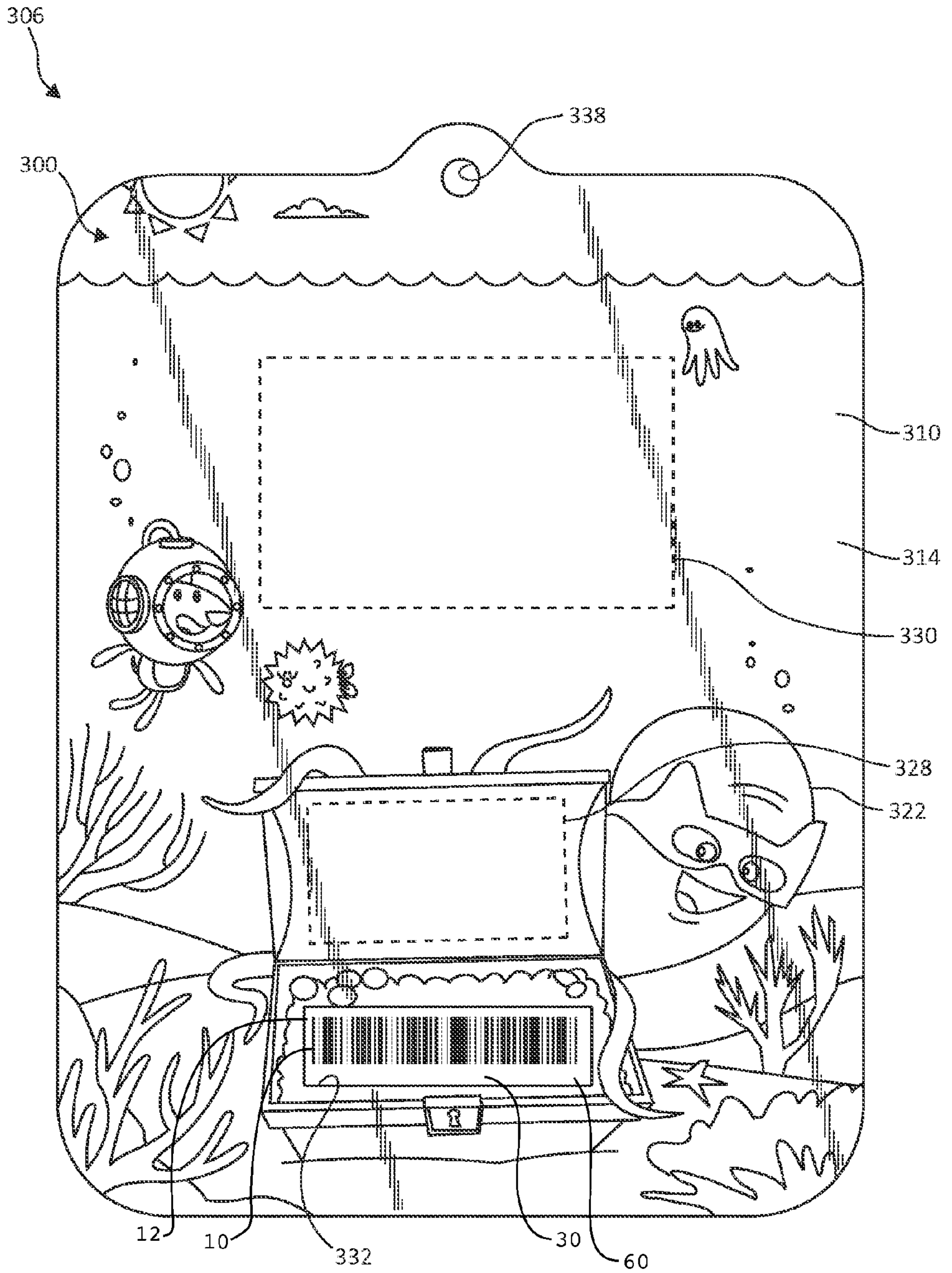
FIG. 25 is a bottom view illustration of the transaction product assembly of FIG. 23, according to one embodiment of the present invention.

As illustrated in FIGS. 23-25, in one embodiment, transaction product 10 is supported on a carrier or backer 300 via a blister 302 to form a packaged transaction product assembly 306. In one embodiment, glasses 180 are provided in and package with transaction product 10 in blister 302. In an alternative embodiment, which is illustrated in FIGS. 23-25, glasses 180 are provided as part of transaction product assembly 306, but are packaged in a separate blister 304 (FIG. 23). Referring, for example, to the front view of FIGS. 23 and 24 and the rear view of FIG. 25, backer 300 comprises a single layer or multiple layers of paper or plastic material, for example, generally in the form of a relatively stiff but bendable/flexible card. Use of other materials is also contemplated. In one embodiment, backer 300 defines a first or front surface 308 and a second or rear surface 310 positioned opposite front surface 308, where the front surface 308, as described with respect to backer 300, refers to a surface configured to face potential consumers when positioned in a retail display. In one example, one or both of front surface 308 and rear surface 310 are substantially planar. Backer 300 displays indicia, graphics or text information including store logo(s), store name(s), slogans, advertising, instructions, directions, brand indicia, promotional information, holiday indicia, seasonal indicia, media format identifiers, characters and/or other information.

For example, in one embodiment, backer 300 includes decorative indicia 322, which makes backer 300 more aesthetically pleasing to potential consumers, and also ties the visual aesthetic of backer 300 to the appearance of transaction product 10, e.g., to decorative indicia 66 on cover 12 and/or decorative indicia 144 on sheet members 14. For instance, decorative indicia 322 provide background scenery or other related graphics to a common theme of transaction product 10. In the illustrated embodiment, where decorative indicia 66 and/or decorative indicia 144 depict transaction product 10 as a dog or other character, decorative indicia 322 provides an associated scene and/or includes corresponding depictions of the dog or other character.

In one embodiment, backer 300 includes brand indicia 324, which identify a store, brand, department, etc. and/or services associated with transaction product 10, and, in one example are similar to brand indicia 68 and 146. In one example, backer 300 includes indicia 326 including "to," "from," and "amount" fields. The fields of indicia 326 provide areas of backer 300 configured to be written upon by a consumer to personalize backer 300 for presentation as a gift to a particular recipient, for a particular purpose, and/or to indicate a value of transaction product 10.

In one embodiment, backer 300 includes redemption indicia 328, generally indicated by a dashed box in FIG. 25, indicating that transaction product 10 is redeemable for the purchase of goods and/or services and that upon use, a value of the purchased goods and/or services will be deducted from the financial account or record linked to transaction product 10. In one embodiment, redemption indicia 328 include phrases such as "<NAME OF STORE> GiftCard" and "This GiftCard is redeemable for merchandise or services at any of our stores or at our web site," and/or provides help or phone line information in case of a lost, stolen, or damaged transaction product, etc.

As illustrated in FIGS. 23-25, in one example, promotional indicia 330 advertise the non-transactional or amusing functionality of transaction product 10. In one embodiment, promotional indicia 330 generally indicate to a bearer of packaged transaction product assembly 306 that transaction product 10 is a 3D or other story or activity book addition to its financial functionality. As such, promotional indicia 330 further promote the sale of transaction product 10 by drawing the attention of a potential consumer to the non-transactional and amusing feature(s), i.e., booklet functionality, of packaged transaction product 10.

Any of indicia 64, 66, 68, 144, 204, 208, 322, 324, 326, 328, or 330 and/or other indicia optionally may appear anywhere on backer 300 or transaction product 10. Additional information besides that specifically described and illustrated herein may also be included and/or one or more of indicia 64, 66, 68, 144, 204, 208, 322, 324, 326, 328, or 330 may be eliminated.

In one embodiment, backer 300 includes a window or opening 332 for displaying account identifier 60 of transaction product 10 therethrough as illustrated in FIG. 25. As previously described, account identifier 60 is adapted for accessing an account or a record associated with transaction product 10 for activating, loading value to or debiting value from the account or record. In one example, transaction product 10 is coupled with or positioned adjacent front surface 308 (FIGS. 23 and 24) of backer 300, and a bearer viewing rear surface 310 (FIG. 12) of backer 300, which is opposite front surface 308, can view or access account identifier 60 through opening 332. Accordingly, opening 332 allows viewing or other access to account identifier 60 to activate and/or load transaction product 10 without removing transaction product 10 from backer 300. In one embodiment (not shown), a portion of backer 300 alternatively is configured to be folded away from the remainder of backer 300 to access account identifier 60 without removing transaction product 10 from backer 300. Other foldable or non-foldable backers can be used having various sizes and shapes for supporting transaction product 10.

In one embodiment, backer 300 defines an aperture 338 or hook configured to receive a support rod or similar structure in a retail display such that backer 300, and therefore, packaged transaction product assembly 306 as a whole, can be hung therefrom. Other suitable features for backer 300 will be apparent to those of skill in the art upon reading the present application.

Blister 302 is vacuum formed or otherwise molded from transparent and/or translucent plastic (e.g., polyvinyl chloride) or other suitable material to form a shell 334 with a cavity formed therein and sized and shaped to specifically receive transaction product 10. In one example, a perimeter flange 336 extends around shell 334. Perimeter flange 336 defines a substantially planar rear surface (not shown) of blister 302 configured to be adhered or otherwise coupled to front surface 308 of backer 300 or as illustrated interposed and secured between two layers 312 and 314 of backer 300. Blister 304 is formed similarly to blister 302 with shell 334 and perimeter flange 336, however, blister 302 is formed to be shaped similarly to and just slightly larger than glasses 180 rather than transaction product 10. In one embodiment, glasses 180 are folded somewhat similarly to as described above except that ear extensions 224 are still exposed when packaged a part of transaction product assembly 306 as illustrated in FIG. 23.

In one embodiment, backer 300 is formed of a first layer 312 over a similarly sized and shaped second layer 314. A card aperture 316 and a glasses aperture 318 are formed through first layer 312 exposing a top surface 320 of second layer 314 as generally illustrated in FIG. 24. During formation, blisters 302 and 304 are placed to extend through card aperture 316 and glasses aperture 318 of first layer 312. Then, second layer 314 is adhered or otherwise coupled to first layer 312 such that perimeter flanges 336 of blisters 302 and 304 are secured between first layer 312 and second layer 314.

Figure 26:
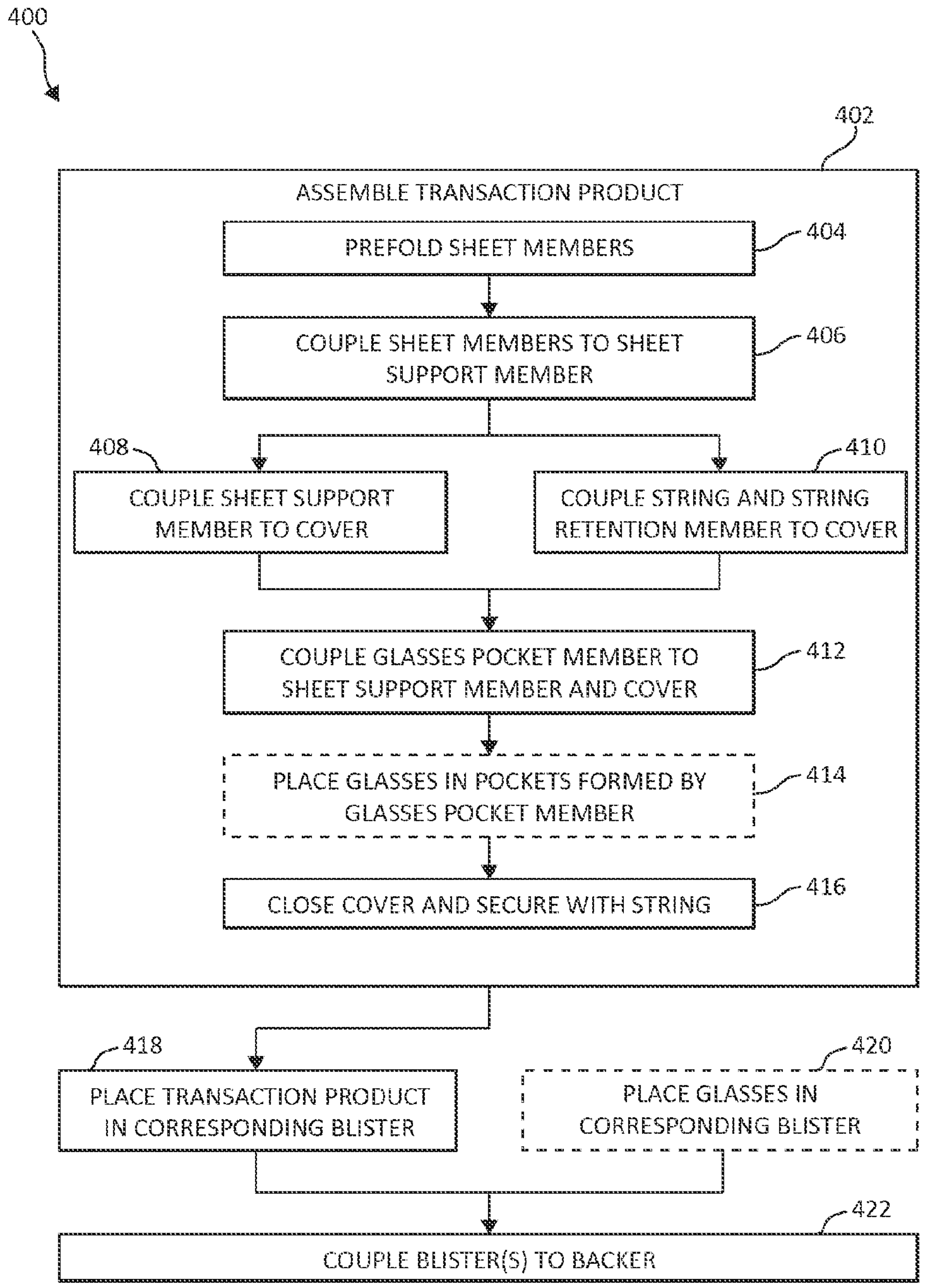
FIG. 26 is a flow chart illustrating a method of assembling a transaction product assembly, according to one embodiment of the present invention.

FIG. 26 is a flow chart illustrating one embodiment of a method 400 of assembling transaction product assembly 306. For example, at 402, transaction product 10 is assembled. At 404, sheet members 14 are fold to define center fold lines 122, diagonal fold line 124, transverse fold line 126, and longitudinal fold line 128 with fold directions as describe above. Then, at 406, pre-folded sheet members 14 are coupled to sheet support member 16, in particular, one sheet member 14 is centered on and adhered to each of a plurality of pairs of panels 92. When coupled to each other, center portions 136, transition portions 138, and longitudinal portions 140 all remain free to rotate or fold relative to static portions 134, which are adhered directly to sheet support member 16.

In one embodiment, at 408, a portion of internal surface 82 of sheet support member 16 formed by first panel 96 of pair of panels **92*a* is coupled with, e.g., adhered to, interior surface 32 of cover 12, more particularly, a portion of interior surface 32 formed by top panel 34 of cover 12. At 410, which may occur before or after any one or more of operations 404, 406, and 408, string 148 is thread through apertures 162 and 164 and tied into a knot 166. Edge panels 158 of string retention member 150 are adhered or otherwise secured to a portion of internal surface 32 defined by bottom panel 38 of cover 12**.

At 412, glasses reception structure including primary member 182 and two pocket members 200 is secured to sheet support member 16 and cover 12, for example, via coupling to string retention member 150. At 414, glasses 180 are optionally placed in cavities 214 formed between pocket members 200 and primary member 182 as illustrated in FIG. 22. In another embodiment, glasses 180 are not placed in cavities 214 during assembly method 400. At 416, cover 12 is closed, i.e., top member 34 is rotated toward bottom member 38 or vice versa about fold lines 40 and/or 42 and string 148 is placed around top panel 34 of cover 12 to form the closed transaction product 10 illustrated in FIGS. 1-6.

In one embodiment, assembly method 400 continues with placement of transaction product 10 in blister 302 and/or placement of glasses 150, if glasses were not positioned in cavity 214 of glasses reception structure at 414, are similarly placed in blister 304. At 422, blisters 302 and 304 are placed relative to backer 300 and perimeter flanges 336 of blisters 302 and 304 are secured to backer 300 thereby securing transaction product 10 and glasses 150 to backer 300 for support during display of transaction product assembly 306. Other methods of manufacturing, orders of steps, etc. are contemplated and will be apparent to those of skill in the art upon reading the present application.

For example, as an alternative to blisters 302 and 304, transaction product 10 may be coupled with backer 300 to form transaction product assembly 306 to package transaction product 10 for retail sale via adhesive, skinning, clam shell packaging, etc. In one example, following operation 422, transaction product 10, is secured to backer 300 in a manner aligning account identifier 60 of transaction product 10 with opening 332 in backer 300 such that account identifier 60 is accessible for scanning while transaction product 10 is coupled with backer 300. Once transaction product 10 is assembled and packaged during method 260, transaction product assembly 306 is ready for retail display, etc.

Figure 27:
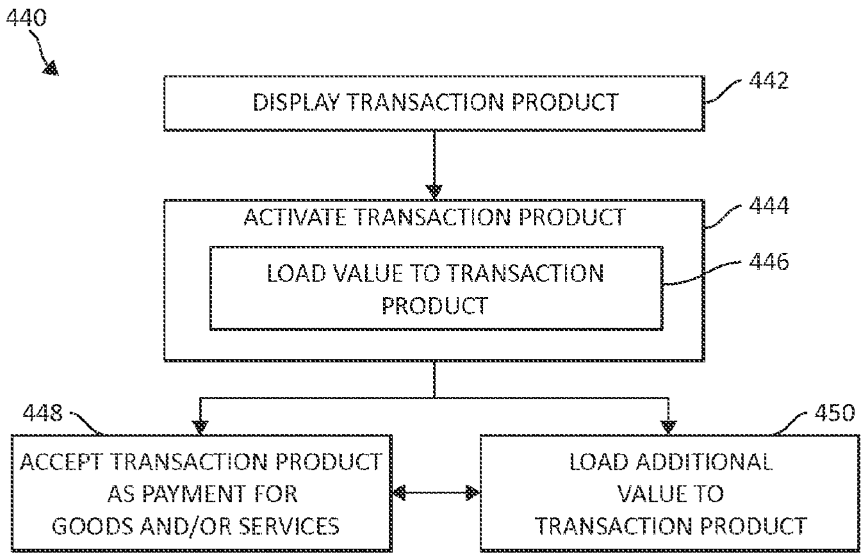
FIG. 27 is a flow chart illustrating a method of encouraging purchase and facilitating use of a transaction product assembly, according to one embodiment of the present invention.

FIG. 27 is a flow chart illustrating one embodiment of a method 440 of encouraging purchase and facilitating use of transaction product assembly 306 by consumers and/or recipients. At 442, transaction product assembly 306 is placed on or hung from a rack, shelf, or other similar device to display transaction product assembly 306, and therefore, transaction product 10, for sale to potential consumers. In one embodiment, a depiction of transaction product 10 and/or transaction product assembly 306 is additionally or alternatively placed on a website for viewing and purchase by potential consumers.

At 444, a consumer who has decided to purchase transaction product assembly 306 presents transaction product assembly 306 to a retail store employee, retail store kiosk, remote terminal, or other person or device to scan account identifier 60 using a point-of-sale terminal or other machine to access an account or record linked to account identifier 60. Notably, as used herein "purchase" of transaction product assembly 306 does not require a fee or other dollar amount to be paid for transaction product 10, but rather that transaction product 10 is being activated and funds placed in the associated account or record. In one example, purchase of transaction product assembly 306 does require a fee to be paid to the retail store or setting. In particular, account identifier 60 is scanned or otherwise accessed, for example through opening 332 of backer 300 to activate transaction product assembly 446, more particularly, transaction product 10 and the remote, database stored account or record linked thereto. Upon accessing the account or record, then, at 446, value is added to the account or record in the form of monetary value, points, minutes, etc. Thus, transaction product 10 is activated and loaded for future use toward a purchase or use of goods and/or services.

In one example, a predetermined value is associated with transaction product 10 (i.e., associated with the account or record linked to transaction product 10 via account identifier 60) prior to activation and display, but such predetermined value is not initially available for use toward the purchase or use of goods and/or services. In such an embodiment, at 444, transaction product 10 is activated to permit subsequent access to the predetermined value (e.g., subsequent loading on and debiting from the account or record) and no additional value is added during activation such that operation 446 may be eliminated.

Once transaction product 10 is activated and loaded, transaction product 10 can be used by the consumer or any other bearer of transaction product 10 to purchase goods and/or services at the affiliated retail setting (e.g., a retail store or website) or can be used in exchange for calling minutes, etc. In one embodiment, where transaction product 10 is displayed on a website at 442, then, at 444, transaction product 10 may be activated in any suitable method and may not require the physical scanning of account identifier 60 to be activated or to otherwise access the associated account or record such as at 446.

In one example, at 448, the retail store or other affiliated retail setting or website accepts transaction product 10, or more precisely, value in the account or record linked to transaction product 10 via account identifier 60, as payment toward the purchase of goods and/or services made by the current bearer of transaction product 10. In particular, the value currently loaded on transaction product 10 (i.e., stored or recorded in the account or record linked to account identifier 60) is applied toward the purchase of goods and/or services. At 450, additional value is optionally loaded on transaction product 10 at a point-of-sale terminal, kiosk or other area of the retail store or related setting using account identifier 60. Upon accepting transaction product 10 as payment at 448, the retail store or related setting can subsequently perform either operation 448 or operation 450 as requested by a current bearer of transaction product 10. Similarly, upon loading additional value on transaction product 10 at 450, the retail store or related setting can subsequently perform either operation 450 again or operation 448. In one example, the ability to accept transaction product 10 as payment for goods and/or services is limited by whether the account or record associated with transaction product 10 has any value stored or recorded therein at the time of attempted redemption.

Figure 28:
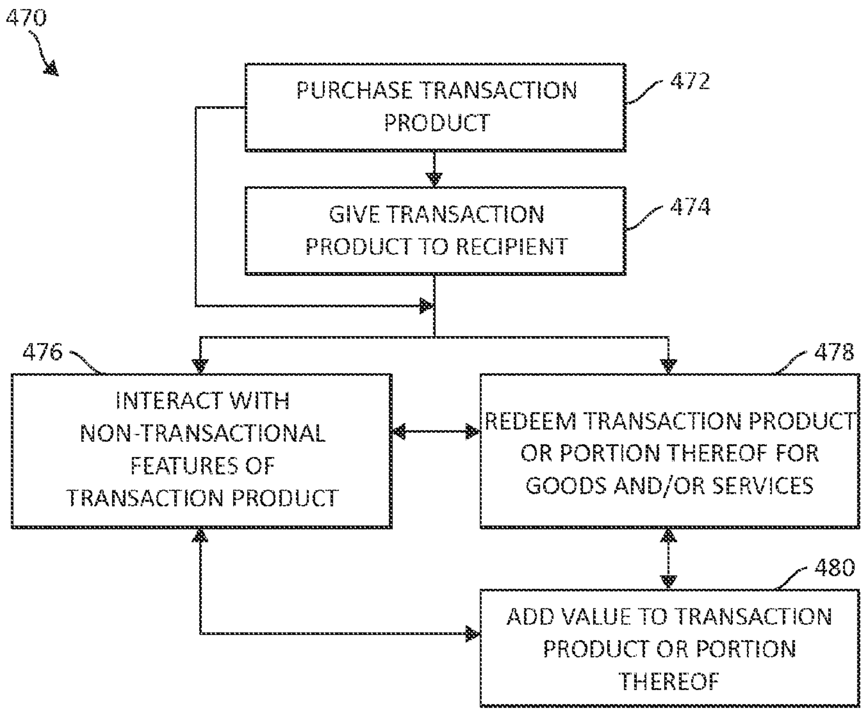
FIG. 28 is a flow chart illustrating a method of using a transaction product assembly, according to one embodiment of the present invention.

FIG. 28 is a flow chart illustrating one embodiment of a method 470 of using transaction product assembly 306. At 472, a potential consumer of transaction product assembly 306, which is displayed in a retail store or viewed on a website, decides to and does purchase transaction product assembly 306 from the retail store or website. Upon purchasing transaction product assembly 306, a retail store employee, a retail store kiosk or other person or device scans account identifier 60 (FIGS. 3 and 12) through opening 332 of backer 300 or otherwise reads or accesses account identifier 60. Upon accessing account identifier 60, the account or record linked to account identifier 60 is accessed and activated to load value onto transaction product 10 (i.e., load value to the account or record associated with transaction product 10). In one embodiment, such as where transaction product assembly 306 is purchased at 472 via a website, actual scanning or other mechanical detection of account identifier 60 may be eliminated.

At 474, the consumer optionally gives transaction product assembly 306 to a recipient, such as a graduate, relative, friend, expectant parents, one having a recent or impending birthday, a couple having a recent or impending anniversary, etc. In one embodiment, a plurality of transaction product assembly 306 are purchased and given to partygoers, such as at a birthday party, etc. as party favors or gifts. As an alternative, the consumer can keep transaction product assembly 306 for his or her own use thereby eliminating operation 474.

At 476, the consumer, recipient, or other current bearer of transaction product assembly 306 interacts with the non-transactional features thereof for amusement. More specifically, the bearer of transaction product assembly 306 removes transaction product 10 from packaging (e.g., backer 300 and blister 302), and freely peruses the book formed by transaction product 10, e.g., viewing sheet members 14 with glasses 180 and enjoying watching sheet members 14 unfold with the turning of panels of sheet support member 16 as described above. Such use amuses the bearer and any other observers of transaction product 10.

At 478, the consumer or recipient redeems transaction product 10 for goods and/or services from the retail store or website. At 478, the consumer or recipient of transaction product 10 optionally adds value to transaction product 10, more particularly, to the account or record associated with account identifier 60 included therewith, at the retail store or over the Internet (i.e., via the website). Upon interacting with the non-transaction feature of transaction product 10 at 476, redeeming transaction product 10 at 338 or adding value to transaction product 10 at 340, the consumer or recipient of transaction product assembly 306 subsequently can perform any of operations 476, 478, 480 as desired. In one embodiment, the ability of the consumer or recipient to repeat redeeming transaction product 10 at 478 is limited by whether the account or record linked with transaction product 10 has any remaining value stored or recorded therein at the time of attempted redemption.

Although described above as occurring at a single retail store or website, in one embodiment, purchasing transaction product assembly 306 at 472, redeeming transaction product 10 at 478, and adding value to transaction product 10 at 480 can each be performed at any one of a number of stores adapted to accept transaction product 10 or over the Internet. In one example, a number of stores are each part of a chain or are similarly branded stores. In one example, a number of stores include at least one website and/or at least one conventional brick and mortar store.

Transaction cards and other products come in many forms, according to embodiments of the invention. Stored-value cards, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the card is used, encouraging repeat visits or use. The card remains in the user's purse or wallet, serving as an advertisement or a reminder to revisit the associated merchant. Stored-value cards according to embodiments of the invention provide a number of advantages to both the consumer and the merchant. Other stored-value cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction product comprising:

a cover, a sheet support member including a plurality of pairs of panels each separated from one another by at least one fold line, each pair of panels in the plurality of pairs of panels including a first panel and a second panel rotatably coupled to one another via a different fold line;

a plurality of separate sheet members each configured to transition between a folded configuration and an unfolded configuration and each being coupled to the cover via the sheet support member, wherein:

in the folded configuration, each of the plurality of separate sheet members is maintained within a footprint of the cover, in the unfolded configuration, each of the plurality of separate sheet members extends beyond the footprint of the cover by extending beyond at least two outermost edges of the cover, each of the plurality of separate sheet members is coupled to the first panel and the second panel of a different one of the plurality of pairs of panels such that each of the plurality of separate sheet members is entirely separated from other ones of the plurality of separate sheet members by the sheet support member, and when one of the plurality of separate sheet members is in the unfolded configuration others of the plurality of separate sheet members are in the folded configuration and substantially hidden from view via the sheet support member; and an account identifier statically connected to one of the cover, the sheet support member, and the plurality of separate sheet members, wherein the account identifier links the transaction product to a financial account and is machine readable by a point-of-sale terminal.

2. The transaction product of claim 1, wherein the account identifier is a bar code.

3. The transaction product of claim 1, wherein the account identifier includes at least one of a bar code, a magnetic strip, a smart chip, and a radio frequency identification (RFID) device.

4. The transaction product of claim 1, in combination with a database storing the financial account, wherein the database tracks a monetary value associated with the financial account, and the monetary value is available for use toward a price of a future purchase.

5. The transaction product of claim 1, wherein the at least two outermost edges of the cover include two opposite and longitudinal edges of the cover.

6. The transaction product of claim 1, wherein:

each pair of panels of the plurality of pairs of panels is configured to be folded such that exposed surfaces of the first panel and the second panel of the corresponding pair of panels face one another, and an exposed surface of the second panel of a first pair of panels of the plurality of pairs of panels faces in an opposite direction than an exposed surface of the first panel of a second pair of panels of the plurality of pairs of panels.

7. The transaction product of claim 6, wherein the second panel of the first pair of panels of the plurality of pairs of panels defines a substantially planar interior surface that is opposite the exposed surface of the second panel of the first pair of panels and abuts and is adhered to a substantially planar interior surface of the first panel of the second pair of panels in the plurality of pairs of panels.

8. The transaction product of claim 6, wherein:

each of the plurality of separate sheet members includes predefined fold lines extending in at least three different directions, and each of the plurality of separate sheet members is configured to automatically transition from the folded configuration to the open configuration when the first panel and the second panel of a corresponding one of the plurality of pairs of panels are rotated away from one another.

9. The transaction product of claim 1, wherein each of the plurality of separate sheet members includes graphics that appear to be three dimensional when viewed through three-dimensional viewing glasses.

10. The transaction product of claim 1, wherein:

the cover defines a first portion and a second portion, the transaction product is configured to transition from a closed position to an open position, in the closed position, the sheet support member and the plurality of separate sheet members are folded and form a stack on one of the first portion and the second portion of the cover, and the other of the first portion and the second portion of the cover is positioned on the stack opposite the one of the first portion and the second portion, and in the open position, the first portion and the second portion of the cover are positioned substantially coplanar with one another.

11. The transaction product of claim 10, further comprising a string coupled to the cover and extending from one of the first portion and the second portion of the cover to loop around the stack and the other of the first portion and the second portion of the cover when the transaction product is closed to hold the transaction product closed.

12. A transaction product comprising:
- a cover;
- a sheet support member;
- a plurality of separate sheet members each configured to transition between a folded configuration and an unfolded configuration and each being coupled to the cover via the sheet support member, wherein:
  - in the folded configuration, each of the plurality of separate sheet members is maintained within a footprint of the cover,
  - in the unfolded configuration, each of the plurality of separate sheet members extends beyond the footprint of the cover by extending beyond at least two outermost edges of the cover, and
  - when one of the plurality of separate sheet members is in the unfolded configuration others of the plurality of separate sheet members are in the folded configuration and substantially hidden from view via the sheet support member;
- a glasses reception assembly including a substantially planar primary member and two pocket panels, wherein:
  - each of the two pocket panels is coupled to a different opposing end of the substantially planar primary member to form a pocket between each of the two pocket panels and the substantially planar primary member, and
  - each pocket is open toward the other pocket; and
- an account identifier statically connected to one of the cover, the sheet support member, and the plurality of separate sheet members, wherein the account identifier links the transaction product to a financial account and is machine readable by a point-of-sale terminal.

13. The transaction product of claim 12, wherein the substantially planar primary member has a footprint sized and shaped substantially identically to a footprint of any pair of panels in the plurality of pairs of panels.

14. The transaction product of claim 12, in combination with:
- a pair of glasses including a front maintaining a pair of lenses, and
- a pair of bows, wherein each bow in the pair of bows extending rearwardly from an opposite end of the front, wherein the pair of glasses is configured to fold into a substantially planar form.

15. The combination of claim 14, wherein each end of the pair of glasses fits within a different pocket such that the pair of glasses extends between the pockets and is selectively secured to the transaction product.

16. The combination of claim 14, further comprising a backer separately supporting each of the transaction product and the pair of glasses.

17. The combination of claim 14, wherein:
- a first transverse fold line extends across a mid portion of the front of the pair of glasses,
- a second transverse fold line extends across one of the bows of the pair of glasses, and
- when the pair of glasses is secured within the pockets of the transaction product, the first transverse fold line and the second transverse fold line align with one another and a center transverse fold line defined by the substantially planar primary member allowing the substantially planar primary member and the pair of glasses to be easily folded on themselves without damaging the pair of glasses.

18. A prepaid access card comprising:
- means for supporting a plurality of sheet members;
- means for selectively enclosing the means for supporting and the plurality of sheet members when the means for selectively enclosing is in a closed position, the means for selectively enclosing providing a first portion on one side of the means for supporting and the plurality of sheet members and a second portion on the other side of the means for supporting and the plurality of sheet members when the means for selectively enclosing is in the closed position;
- means for selectively maintaining a first end of a pair of glasses;
- means for selectively maintaining a second end of the pair of glasses, the second end of the pair of glass being opposite the first end, the means for selectively maintaining the second end of the pair of glasses being entirely spaced and formed separately from the means for selectively maintaining the first end of the pair of glasses, and both the means for selectively maintaining the first end of the pair of glasses and the means for selectively maintaining the second end of the pair being positioned within the means for selectively enclosing when the means for selectively enclosing is in the closed position; and
- means for linking the prepaid access card to an account having a balance, wherein the balance is a monetary value available toward a price of a future purchase.

19. The prepaid access card of claim 18, in combination with the pair of glasses, wherein the pair of glasses are configured to be folded to be maintained between the first portion and the second portion of the means for selectively enclosing when the means for selectively maintaining is in the closed position.

20. A method of displaying and facilitating use of a transaction product, the method comprising:
- providing the transaction product including:
  - a cover having two opposing cover portions,
  - a number of expandable pages, each expandable page in the number of expandable pages being configured to transition from a compact position maintained within a footprint of one cover portion of the two opposing cover portions to an expanded position extending beyond at least two side edges of the one cover portion of the two opposing cover portions,
  - a page coupling member supporting each of the number of expandable pages such that rotation of a portion of the page coupling member changes which expandable page in the number of expandable pages is positioned for viewing, wherein the page coupling member including a plurality of fold lines dividing the page coupling member into a plurality of panels separated by the plurality of fold lines, and the page coupling member is coupled to each of the number of expandable pages on a different two of the plurality of panels adjacent to one of the plurality of fold lines, and
  - an account identifier coupled to the cover and associating the transaction product with a remote account having a financial balance available toward a price of a purchase; and
- activating the transaction product using the account identifier to ready the financial balance for use toward the price of the purchase.

21. The method of claim 20, further comprising:

displaying the transaction product on a supporting backer to potential consumers;

displaying a pair of glasses for use when viewing one or more of the expandable pages in the number of expandable pages, the pair of glasses being supported on the supporting backer such that the transaction product, the pair of glasses, and the supporting backer are all simultaneously viewable by the potential consumer.

22. The method of claim 21, wherein providing the transaction product includes providing one or more pockets for selectively maintaining the pair of glasses during periods of non-use between the two opposing cover portions when the cover is in a closed position.

23. The method of claim 21, wherein the pair of glasses are configured for viewing planar images in three-dimensional format.

* * * * *